US008504504B2

(12) United States Patent
Liu

(10) Patent No.: US 8,504,504 B2
(45) Date of Patent: Aug. 6, 2013

(54) SYSTEM AND METHOD FOR DISTRIBUTED DENIAL OF SERVICE IDENTIFICATION AND PREVENTION

(75) Inventor: Lei Liu, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 912 days.

(21) Appl. No.: 12/239,521

(22) Filed: Sep. 26, 2008

(65) Prior Publication Data

US 2010/0082513 A1    Apr. 1, 2010

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

| | | | |
|---|---|---|---|
| 6,785,820 B1* | 8/2004 | Muttik et al. | 726/24 |
| 2003/0046577 A1* | 3/2003 | Silverman | 713/200 |
| 2005/0086526 A1* | 4/2005 | Aguirre | 713/201 |
| 2005/0138413 A1* | 6/2005 | Lippmann et al. | 713/201 |
| 2005/0249214 A1* | 11/2005 | Peng | 370/392 |
| 2006/0230289 A1* | 10/2006 | Fox et al. | 713/188 |
| 2006/0282892 A1* | 12/2006 | Jonnala et al. | 726/23 |
| 2007/0067452 A1* | 3/2007 | Fung et al. | 709/224 |
| 2008/0028467 A1* | 1/2008 | Kommareddy et al. | 726/23 |

OTHER PUBLICATIONS

'Exploitation and threat analysis of open mobile devices': Liu, 2009, ACM, 978-1-60558-630, pp. 20-29.*

Cheng J., Wang, H., Shin K.G., "Hop-Count Filtering: An Effective Defense Against Spoofed DDoS Traffic," Proceedings of the 10th ACM Conference on Computer and Communications Security, 2003, pp. 30-41.
Keromytis, A., Misra, V., Rubenstein, D., "SOS: Secure Overlay Services," ACM SIGCOMM '02, Aug. 19-23, 2002, pp. 61-72.
Mirkovic, J., D-Ward: "Source-End Defense Against Distributed Denial-of-Service Attacks," Ph.D. Thesis, University of California Los Angeles, 2003.
Mirkovic, J., Robinson, M., Reiher, O., Oikonomou, G., "Distributed Defense Against DDoS Attacks," University of Deleware technical report, 2003.
Park, P., Lee, H., "Distributed DoS Attack Prevention in Power-Law Internets," SIGCOMM'01, Aug. 27-31, 2001, pp. 15-26.

(Continued)

*Primary Examiner* — Kakali Chaki
*Assistant Examiner* — Peter Coughlan
(74) *Attorney, Agent, or Firm* — Robert C. Kowert; Meyertons, Hood, Kivlin, Kowert & Goetzel, P.C.

(57) ABSTRACT

Systems and methods for discovery and classification of denial of service attacks in a distributed computing system may employ local agents on nodes thereof to detect resource-related events. An information later agent may determine if events indicate attacks, perform clustering analysis to determine if they represent known or unknown attack patterns, classify the attacks, and initiate appropriate responses to prevent and/or mitigate the attack, including sending warnings and/or modifying resource pool(s). The information layer agent may consult a knowledge base comprising information associated with known attack patterns, including state-action mappings. An attack tree model and an overlay network (over which detection and/or response messages may be sent) may be constructed for the distributed system. They may be dynamically modified in response to changes in system configuration, state, and/or workload. Reinforcement learning may be applied to the tuning of attack detection and classification techniques and to the identification of appropriate responses.

20 Claims, 12 Drawing Sheets

OTHER PUBLICATIONS

Satyanarayanan, M., "Fundamental Challenges in Mobile Computing," Proceedings of the fifteenth annual ACM symposium on Principles of distributed computing, 1996, pp. 1-7.

Saltzer, J. H., Reed, D. P., and Clark, D. D. 1984. "End-to-end arguments in system design," ACM Trans. Comput. Syst. 2, 4 (Nov. 1984), 277-288.

* cited by examiner

SYSTEM AND METHOD FOR DISTRIBUTED DENIAL OF SERVICE IDENTIFICATION AND PREVENTION

BACKGROUND OF THE INVENTION

1. Field of the Invention

This invention relates generally to distributed computing resources, and more particularly to systems and methods for distributed denial of service attack tree discovery and flood control.

2. Description of the Related Art

Distributed Denial of Service (DDoS) attacks are a critical issue for dynamic and stochastic task environments. The result of these attacks is often removal or degradation of one or a set of computation nodes within a dynamic task environment, and/or removal or degradation of one or a set of storage nodes within a distributed storage environment. A typical class of attacks could be initiated from a leaf processing node against a pervasive computing graph along the edges of the vertices. For example, a DDoS attack may apply a scanning operation throughout an entire grid environment (e.g., on all nodes) or may deploy a malicious agent on those nodes to consume memory and/or CPU resources.

Intrusion detection is a method of identifying attempts to compromise CIAA (confidentiality, integrity, availability and authenticity) of computational resources. Various data center operations may perform intrusion detection manually or automatically. Manual intrusion detection typically examines evidence from system calls, log files, audit trails or network packet flows. Systems that perform automated intrusion detection are sometimes referred to as intrusion detection systems (IDSs). Modern IDSs typically employ a combination of the above two classes of techniques. As probable attacks are discovered by IDSs, relevant information is typically logged to files or databases and alerts are generated. In addition, automatic responsive actions and/or even preventive rule-based controls may be implemented through access control systems.

Due to advances in information security techniques, intrusion preventive systems (IPSs) described in the literature may provide a practical mechanism to defend against intrusion attacks on computational graphs or prevent abuse of computational resources. These IPSs can be divided into two categories: misuse-prevention techniques and anomaly-prevention methods. Misuse-prevention tools are typically based on a set of signatures that describe known attack states and that are used to match a current state against a known attack state. If a current state corresponding to an actual attack matches one of attack classes listed in the database, then it is successfully identified. A disadvantage of this approach is that it cannot prevent previously unknown attacks (also called zero-day attacks). Anomaly prevention uses profiles about normal states to prevent intrusions by noting significant deviations between the parameters of the observed traffic of networks and those of normal states. Prevention against anomaly attacks has been an active research topic. However, it suffers from high false-positive error rates because unseen normal behaviors are often misclassified as attacks.

Current methods for intrusion detection and prevention (including some that use reinforcement learning) are built on static architectures and/or parameters (e.g., a fixed number of nodes, layers of computations, and number and type of parameters). These methods typically depend on supervised training with known attack types. However, in dynamic programming settings, there may be no available training set. Current methods for intrusion detection using machine learning typically require human interaction to improve rule-based binary classifications, and tuning is limited within a fixed architecture having fixed optimized weights and biased nodes that impact classification results. In addition, current methods typically return results as a classification (typically, a binary classification: attack yes or attack no). Evolution computing has been proposed improve learning networks. However, it inherits the memory bound problem in traditional artificial intelligence techniques.

SUMMARY

Systems and methods for discovery and prevention of denial of service attacks in a distributed computing system are disclosed. In some embodiments, the system may employ local data collection agents on each of a plurality of nodes to detect resource-related events on those nodes. For example, a data collection agent may be configured to detect a parameter value crossing a threshold value, a parameter value change rate exceeding a change rate threshold, a parameter value becoming out of range, a parameter value becoming in range, or a change in a parameter value trend. In various embodiments, data collection agents may be implemented using software, hardware (e.g., sensors), or a combination of software and/or hardware elements configured to detect resource-related events.

An information layer agent on one or more nodes (e.g., on each node or on one or more central nodes) may determine if an event is indicative of an imminent or current attack, may determine if the event represents a known attack pattern or a previously unknown attack pattern, and may classify the attack. The information layer agent may consult a knowledge base comprising information associated with known attack patterns, including state-action mappings.

The information layer agent may initiate appropriate responses to prevent and/or mitigate the attack, including sending warnings and/or modifying resource pool(s) on a current victim node (e.g., the node on which a resource-related event was detected) and/or on potential victim nodes (e.g., the neighbors of a current victim node). In some embodiments, if it is determined that an event represents a previously unknown attack pattern, the information layer agent may perform clustering analysis to identify a known attack pattern sharing at least some characteristics with the unknown attack pattern, and may initiate a response action dependent on the identified known attack pattern. In other embodiments, the information layer agent may randomly select a response action for a previously unknown attack pattern, or may initiate simulation of the unknown attack pattern.

In some embodiments, an attack tree model and/or an overlay network (over which detection and/or response messages may be sent) may be constructed for the distributed system. For example, an attack detection and classification technique may be applied in response to the event detection, which may probe the nodes of distributed computing system using multicast inquires to construct a model of the progression (or likely progression) of an attack from one node to another in the distributed system. The attack tree model and/or overlay network may in some embodiments be dynamically modified in response to changes in system configuration, state, and/or workload.

Reinforcement learning techniques may be applied to the tuning of attack detection and classification techniques, to construction and/or modification of the attack tree model and/or overlay network, and to the identification of appropriate responses. For example, tuning the attack detection and classification techniques may in various embodiments include modifying a number of input nodes, output nodes or hidden nodes of a model of the distributed computing system, selecting a different attack detection and classification technique, adding, removing or modifying a state-action value pair used by the attack detection and classification technique, or modifying a number of layers of an overlay network for the system.

The methods described herein may be implemented, at least in part, by program instructions stored in a memory coupled to one or more processors on various nodes in a distributed computing system, (e.g., by program instructions stored on a computer-readable storage medium and executable by the one or more processors in the computing system). The program instructions may be included in the same memory as one in which a knowledge based of known attack pattern information in stored, or in a different memory, in different embodiments. In some embodiments, the knowledge base may be partitioned according to attack type, resource domain, or other parameters, and may be distributed on multiple nodes in the computing system.

Figure 1:
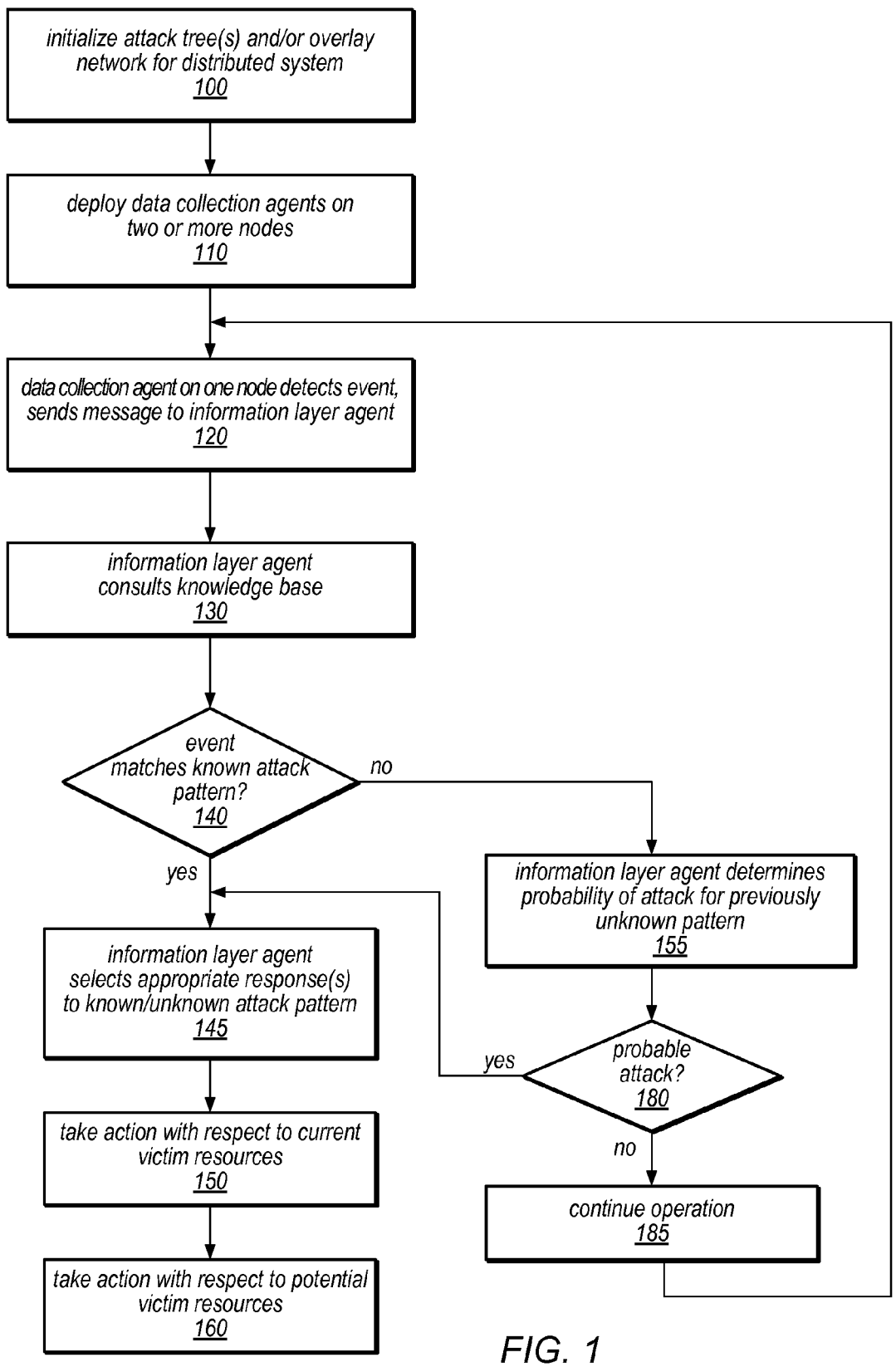
FIG. 1 is a flow chart illustrating a method for identifying and responding to a DDOS attack, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and methods for providing autonomous denial of service (DOS) attack prevention, attack detection/identification, and/or rule making in dynamic distributed networks are disclosed. The systems and methods described herein may in some embodiments be suitable for application to distributed denial of service (DDoS) attacks in peer-to-peer (P2P) environments, mobile networks, grid computing environments, and/or other diverse task environments. As described herein, in some embodiments, a learning approach (e.g., Q function or other reinforcement learning approach) may facilitate preventative detection through methods for refining detection of and responses to known attack patterns, discovering new attack patterns and/or building attack tree models (e.g., models of the expected or actual progression of an attack from one node to the next in a distributed environment) for use in near-future predictions and adaptive flood control. For example, an attack may begin at a leaf node and move to others (e.g., neighboring nodes). In some embodiments, the attack discovery algorithm may probe the distributed environment beginning at the initial victim mode and moving up to the tree to the root node, sending notifications and/or taking other actions in order to block the attack. The system and methods described herein may be generally applicable to attacks of various types and on various resources in a distributed system, including memory, input/output (I/O) resources, storage resources, and compute (e.g., CPU) resources, in different embodiments.

Previous attempts at machine learning-based prevention networks relied heavily on static architectures and/or parameters (e.g., a fixed number of nodes, layers of computations, and number and/or type of parameters monitored). In contrast, the methods described herein may in some embodiments include dynamically modifying attack tree models and/or membership functions based on in-bound pattern fluctuations and/or changes to system configurations, workloads, etc. (e.g., incrementally refining initial, arbitrary models using machine learning techniques). These methods may in some embodiments be transport-level independent (i.e., they may be applied at or above level 7, rather than at level 3 or 4).

The system and methods described herein may provide learning based searches for DDoS detection and corresponding scheduling to control attack traffic. They may include event driven messaging in a reprogrammable, scalable response/resolution environment (e.g., a virtual overlay network), as described in more detail herein. In some embodiments, the methods may include dynamic promotion and/or demotion of membership functions (or rules thereof), and may report a probability of an attack, rather than an event classification. These methods may in some embodiments facilitate self-managed defense systems that are automatically adaptable to environmental changes during normal usage, to variations in known or previously unknown attack patterns, and to corresponding changes in responses to attacks over time.

The autonomous machine learning methods described herein may differ from those of traditional learning based IDSs and even traditional artificial intelligence (AI) machine learning techniques in several areas, as described below. In some embodiments, detection may be initialized using an arbitrary network with a programmable architecture, and may be autonomously tuned by a reinforcement learning (RL) based utility framework. In previous systems, in order to train learning networks (e.g., neural networks), the numbers and types of input nodes, layers, the nodes at which to present non-linearity, and output nodes are predefined based on problem specifications. However, these specifications may not be known ahead of time or may not be feasible to apply to online detection, limiting performance and convergence of detection. Therefore, rather than using this type of static detection architecture, in some embodiments the methods described herein may include the use of a programmable architecture without fixed input nodes, hidden layers, and/or output nodes. The reinforcement learning based utility framework may be configured to autonomously tune the input nodes, hidden layers and output nodes. Therefore, the architecture of the neurons may become the parameters of the RL based tuning framework. In addition, the approximating architecture may not be restricted to a multilayered perceptron structure with sigmoidal nonlinear functions. Instead, any arbitrary structures, such as Bayes Networks, may be autonomously constructed and tuned, in various embodiments.

Previous learning-based IDSs typically required supervised training with known attack types to map inputs and outputs, where matching involves unknown non-linearity. However, in dynamic programming (DP) settings, there may be no available training set that could be used for approximation. In some embodiments, evaluations may be performed by simulation, with the decisions being improved using simulation results. In some embodiments, with simulations involving autonomous (i.e., self-managed) tuning using the RL based utilities described herein, effective online detection may be facilitated without training. For simulations of unknown attacks, those having the most frequently occurring states may be better approximated than those of average frequency.

Furthermore, because existing machine learning methods are typically computationally intensive, and exhibit a considerable percentage of training errors for large state spaces, off-line training is commonly used for approximation mapping. By contrast, the system and methods described herein may in some embodiments use an RL based tuning utility framework to ensure online learning to improve detection in real time. This may allow the methods the flexibility to better control intrusion detection.

In addition, in complex systems with large state spaces, large amounts of training data may be required for approximation if traditional machine learning networks are used for detection. However, a sufficient volume of data may not be available in real time. Therefore, the system and methods described herein may employ autonomous tuning with training and online learning (e.g., a combination of DP techniques, RL techniques, and neural networks, in which RL is used for tuning). In contrast to traditional learning networks, the methods described herein may comprise self-managed learning methods, such that biased datasets may impact convergence but not detection results.

Previous tuning-based intrusion detection systems have been proposed for fixed detection models. However, unlike the autonomous methods described herein, those methods typically rely on human interactions to continually improve rule-based binary classifiers. Furthermore, in traditional learning networks, tuning is limited within a fixed architecture with fixed weightings and biased nodes. By contrast, the system and methods described herein may in some embodiments employ an interactive utility framework to tune the entire architecture using least squared error fitting. In addition, rather than including specified parameters in the feature vectors, the methods described herein may start with any arbitrary number of parameters as input to prevention networks. Traditionally, feature vectors were summarized in a heuristic sense to be critical characteristics of each state, and analysis and intuition need to be applied to derive the feature parameters. In the systems described herein however, there may be no static architecture, and the RL based utility framework may tune the number and/or selection of parameters used.

To serve large continuous system spaces, the RL based methods described herein may provide state-action and reward/cost factor mapping. In some embodiments, semi-Markov Decision Problem (SMDP) theory may be applied. Specifically, RL search approximation and learning factor multi-layer perceptron may be employed to simplify search decision organization and prediction. In addition, a set of RL interactive algorithmic operations and augmented learning network operations may be included, as described herein.

The methods described herein may provide autonomous tuning of prevention networks without fixed input parameters and/or layer architectures. The tuning may in some embodiments be performed using an incremental algorithm grounded in reinforcement learning techniques. In contrast to traditional optimization techniques requiring static state specification, these methods may use arbitrary state parameters for intrusion prevention optimization. For machine learning in large state space, sample reduction methods may be used. Specifically, both attribute selection and random instance selection may be applied to Q learning for the prevention networks.

In some embodiments, the system and methods described herein may be implemented by components modeled as being on several abstraction layers of a distributed system hierarchy: a data collection layer, an information layer, and a knowledge layer. One or more agents may be deployed on each node to implement these layers. For example, a data collection layer may be implemented by one or more agents (e.g., sensors) distributed on each node in the distributed system. These agents may be responsible for collecting relevant data at each node (e.g., resource usage, performance, workload, etc.) The data collection agents may in some embodiments also be configured to transform or classify collected data (e.g., time series data, or frequency series data) as discrete values (e.g., CPU usage equals "high," "medium," or "low"), according to programmable boundaries. In such embodiments, the data collection agents may report an event in response to a transition from one discrete value to another, e.g., rather than reporting periodic samples or averages of collected data. In other embodiments, data collection agents may report an event in response to detecting a threshold value or a threshold rate of change (e.g., a sudden change, rather than an incremental one). Data collection agents may report these and other events by sending messages to an information layer, in some embodiments.

In some embodiments, an information layer may be implemented by agents distributed among two or more nodes, while in others it may be implemented by an agent on a central node. Information layer agents may be responsible for aggregating data received from one or more data collection layer agents (e.g., data received from one or more nodes and contained in event driven messages) and/or for performing clustering or trend analysis as part of determining the probability that a DDoS attack is underway or is imminent. In some embodiments, information layer agents may apply a rules-based analysis (e.g., using membership functions based on known rules) and/or may apply reinforcement learning techniques (e.g., fuzzy rules) to collected data, and may return a probability that the corresponding event(s) indicate an attack. For example, an information layer agent may be configured to determine if a workload trend (e.g., its rate of change) is outside the expected range for the given workload or workload type.

The information layer agent may consult a knowledge base to determine if observed behavior matches a known attack pattern and therefore indicates that a current or near-term attack is likely. For example, the information layer agent may access a repository of known attack patterns, which may be stored as a portion of a collection of program instructions executable to implement membership functions corresponding to the known attack patterns, or stored as data representing known attack patterns that may be accessed by program instructions executable to implement membership functions, in different embodiments. This knowledge layer may in various embodiments be located on the same node or nodes as the information layer, or on one or more other nodes (e.g., it may be distributed, or may be located on a different central node than the information layer). For example, the knowledge base may include attack patterns and/or membership functions based on 20-40 kernel parameters (e.g., CPU utilization, disk utilization, memory utilization, I/O resource utilization, I/O ratio, network packet ratio, state packet ratio, or another parameter usable in a mathematical model of the system). The knowledge base may associate appropriate responses to known attack patterns and the information layer may invoke these responses if a known attack pattern is detected. For example, in various embodiments and in response to different attack patterns, memory or other resources may be re-allocated in the distributed system, a resource usage quota may be changed, attack notification messages (e.g., warnings, alarms, or alerts) may be sent to one or more nodes (e.g., neighboring nodes), inquiry messages may be sent to one or more nodes (e.g., to probe an attack tree, according to a particular attack discovery and classification algorithm selected for the attack), a resource or node may be shut down or disconnected from the network, etc.

When observed behavior does not match a known attack pattern, the information layer may also be configured to select (e.g., arbitrarily or according to clustering analysis that identifies a known attack pattern having at least some of the same characteristics as the unknown attack pattern) an attack discovery and classification technique, and/or one or more attack responses (e.g., attack notification messages to be sent or modifications to resource pool in order to prevent or mitigate an attack). The information layer may also be configured to dynamically tune the knowledge base based on the results or effect of the response(s) to reflect a previously unknown attack pattern (e.g., by adding or modifying membership functions) using RL techniques. For example, reinforcement learning techniques may be applied to membership functions based on feedback indicating the accuracy of attack predictions made by existing membership functions. In other words, reinforcement learning techniques and/or dynamic programming may be used by information layer agents to recognize new attack patterns, and then to add them (along with appropriate responses) to the knowledge base.

In some embodiments, the information layer may also be configured to update the knowledge base (e.g., to tune membership functions and/or attack responses) based on changes in the system environment and/or workload, in some embodiments. This is described in more detail below. In such embodiments, fuzzy rules, neural nets, or reinforcement learning techniques may be applied to membership functions based on such changes. Note that in some embodiments, additional parameters may be added to attack patterns and/or membership functions maintained by the knowledge layer, if it is determined that they may contribute to more accurate predictions of attack behavior.

In addition to the data layer agents, information layer agents, and/or knowledge base deployed on various nodes of a distributed system, each defensive node may include a mechanism to construct an attack tree and an adaptive packet delivery mechanism for flood control (e.g., an overlay network), as described in more detail herein.

A method for performing DDoS identification and prevention is illustrated by the flow chart in FIG. 1, according to one embodiment. In this example, attack tree(s) and/or an overlay network may be initialized for a distributed system, as in 100. The initial attack trees and/or overlay network may be generated dependent on a predicted, current, or historical system configuration, on simulation data, on training data, or arbitrarily (e.g., based on heuristics or a default configuration), in various embodiments. Note that in other embodiments, an attack tree and/or overlay network may not be constructed or initialized until an attack (or probable attack) is detected).

In the example illustrated in FIG. 1, data collection agents are deployed on two or more nodes in the distributed environment, as in 110. When one of these data collection agents detects an event, as in 120, it sends a message to an information layer agent. For example, the data collection agent may send a message indicating that CPU or I/O resource usage on the corresponding node has changed from a "medium" level to a "high" level. Messages sent between the nodes of the distributed system may be sent via the overlay network, as described in more detail below.

In this example, the information layer agent consults a knowledge base, as shown in 130 and described above, to determine if the event (i.e., the observed behavior) matches a known attack pattern (e.g., as stored in the knowledge base). This is shown as decision block 140. Membership functions based on fuzzy rules and/or trend analysis may be used to determine the probability that a DDoS attack is underway, according to known attack patterns. The probability determination may in some embodiments include weighted computations, in which data values of different parameters have different weightings. For example, if memory usage is "high" and CPU usage is "medium high", the information layer agent may determine that the probability that this indicates a CPU attack is 60%, while if CPU usage is "high" and memory usage is "medium high", the information layer may determine that the probability that this indicates a CPU attack is 75%. In some embodiments, the information layer agent may combine the information contained in the newly received message with other information received from the same or other nodes, and/or with other known parameter values, and the aggregated information may match a known attack pattern. For example, the data collection layer may send a new message to the information layer indicating that CPU usage has transitioned to "high", and that I/O operations have transitioned to "high". The information layer may have received a previous message indicating that memory usage was "medium", and an indication that the workload is characterized as an online transaction load (for which a standard or expected profile exists). In this example, a membership function applied at the information layer may determine that the probability that this behavior indicates a CPU attack is 85%, and may return a value of 85%.

If it is determined that the observed behavior is representative of a known attack pattern, shown as the positive exit from 140, the information layer may select an appropriate response to the known attack pattern, as described herein. This is shown as 145. As illustrated in FIG. 1, action may be taken with respect to the current victim resources (e.g., the resource(s) of the node on which the event was detected). This is shown as 150 in FIG. 1. For example, the information layer agent may alert the corresponding node or may initiate action on the node (e.g., by sending a message indicating that node's resources should be throttled back, removed from the distributed resource pool, or otherwise protected from the predicted attack). In addition, in this example, action may be taken with respect to potential victim resources, as in 160. For example, an adaptive flood control mechanism may be invoked (e.g., by sending messages other nodes) in order to prevent an attack from propagating to neighboring nodes, according to an attack tree for the distributed system and/or individual nodes thereof. This is described in more detail below.

If it is determined that the observed behavior does not match a known attack pattern, shown as the negative exit from 140, the information layer agent may determine the probability that the observed behavior represents a previously unknown attack pattern, as in 155. For example, in some embodiments, the information layer agent may be configured to determine if resource usage or trends therein are a likely indicator of a previously unknown attack pattern (e.g., according to fuzzy rules; Quality of Service policies, authorization/security policies, or other policies; and/or a clustering analysis to determine similarities with known attack patterns). If it is determined that the probability that the observed behavior indicates an attack is high, shown as the positive exit from 180, the method may continue as above, with the information layer selecting an appropriate response, taking action on the current victim node and, in some embodiments, on potential victim nodes, as in 145, 150, and 160 of FIG. 1. For example, the information layer may select an attack discovery algorithm arbitrarily or in accordance with a response suitable for a similar known attack pattern, etc. If it is determined that the probability that the observed behavior indicates an attack is low (e.g., that it is likely that the observed behavior indicates normal operation for the given workload), shown as the negative exit from 180, operation may continue, shown in this example as 185 and the feedback to 120.

Figure 2:
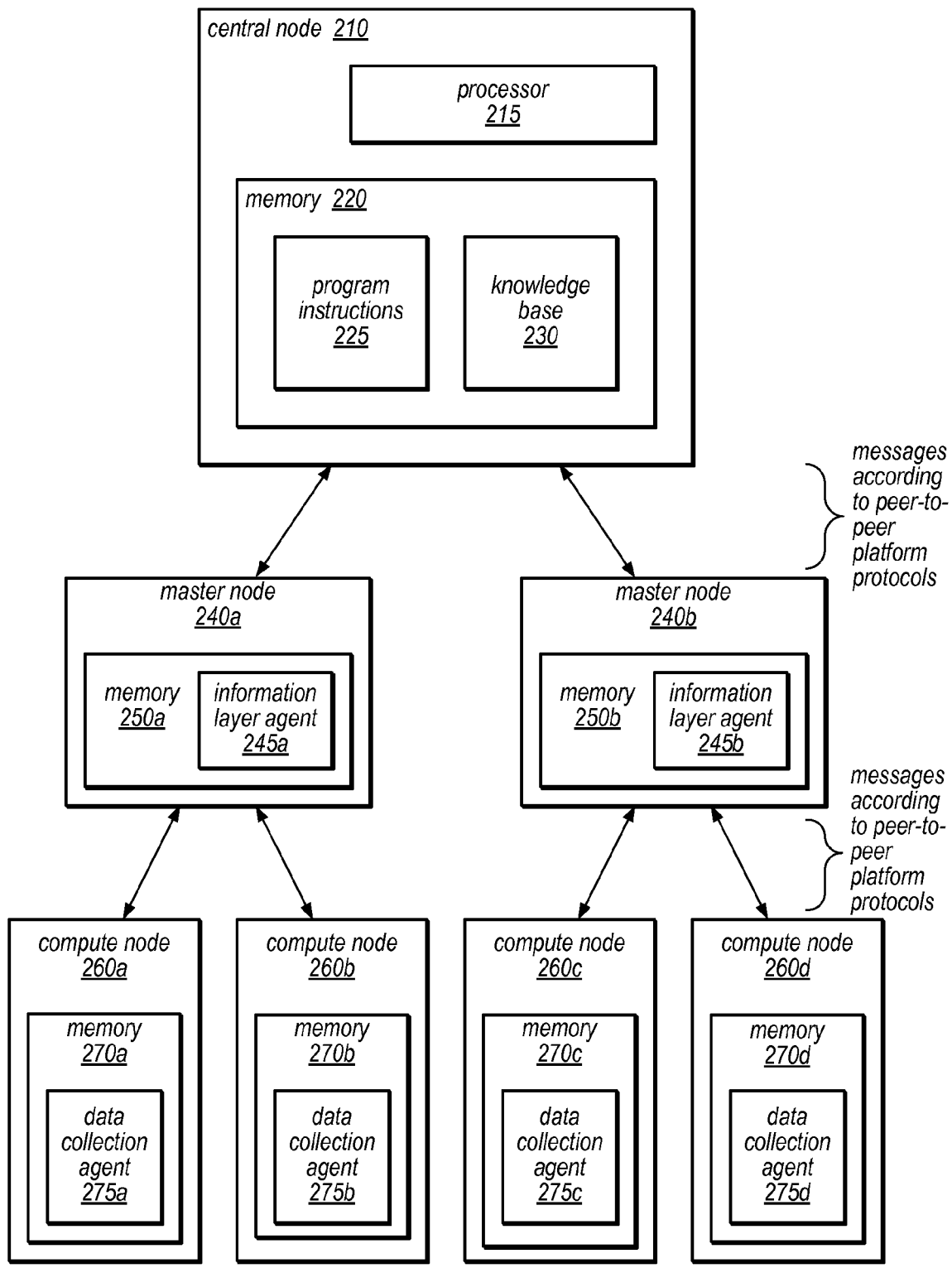
FIG. 2 is a block diagram illustrating a distributed system on which identification and/or prevention of DDOS attacks are implemented, according to one embodiment.

As described above, the methods for identification and prevention/mitigation of DDoS attacks may in some embodiments be implemented in a distributed environment by agents at a data collection layer, an information layer, and a knowledge layer. FIG. 2 illustrates one such distributed system, according to one embodiment. In this example, the distributed system includes a central node 210, two master nodes 240, and four compute nodes 260, although the architecture may be arbitrarily scaled and/or partitioned differently, in different embodiments. In this example, each compute node 260 includes a data collection agent 275, implemented as program instructions stored in a memory 270 and executable on the respective compute node 260 to collect and, in some embodiments, discretize data relevant to that node. In other embodiments, a data collection agent 275 may include one or more sensors (e.g., hardware elements configured to collect data) in addition to, or instead of, such program instructions.

In the example illustrated in FIG. 2, data collection agents 275 of each compute node 260 may send event driven messages to one of the master nodes 240 using peer-to-peer platform protocols, although other communication protocols may be employed in other embodiments. In this example, each of the master nodes 240 includes an information layer agent 245, which may be implemented as program instructions stored in a memory 250 and executable on the respective master node 240 to apply rule-based methods to determine the probability that a detected event indicates a current or imminent attack, to classify the attack (e.g., according to information stored in knowledge base 230), and/or to apply reinforcement learning methods to update the membership functions, attack trees, overlay networks, attack discovery and classification techniques, and/or attack responses stored in knowledge base 230. In this example, knowledge base 230 is included in memory 220 of central node 210, and is accessed using messages exchanged with information layer agents 245 on master nodes 240, according to peer-to-peer platform protocols. For example, information layer agent 245a may access knowledge base 230 to determine if observed behavior reported by data collection agent 275b matches a known attack pattern or if it indicates a previously unknown attack pattern. The information layer agent 245a may return an indication of the probability of an attack (e.g., in messages, according to the peer-to-peer platform protocols) to the compute node 260 and/or to a central node (e.g., central node 210), in various embodiments. Information layer agent 245a may also send messages to one or more of compute nodes 260 in response to determining that an attack is underway (e.g., to send an alarm, warning or other notification message, or to initiate the taking of an action on the node to prevent and/or mitigate the effects of the attack), and/or may send messages to central node 210 (e.g., to update knowledge base 230 in response to feedback, system configuration or workload changes, or observed results of an action taken). Messages may also be exchanged in order to build and/or update the attack tree in response to attack detection (e.g., using multi-cast inquiries). In this example, memory 220 of central node 210 also includes programs instructions 225, executable on central node 210 to maintain and/or update knowledge base 230, or to perform other functionality, in different embodiments.

Note that while the example illustrated in FIG. 2 includes data collection agents 275 and information layer agents 245 implemented as computer-executable program instructions stored in a memory, in other embodiments, data collection agents 275 and/or information layer agents 245 may be implemented in hardware (e.g., in one or more field-programmable gate array components, or FPGAs), or in a combination of hardware and software elements configured to provide the functionality described herein.

Figure 3:
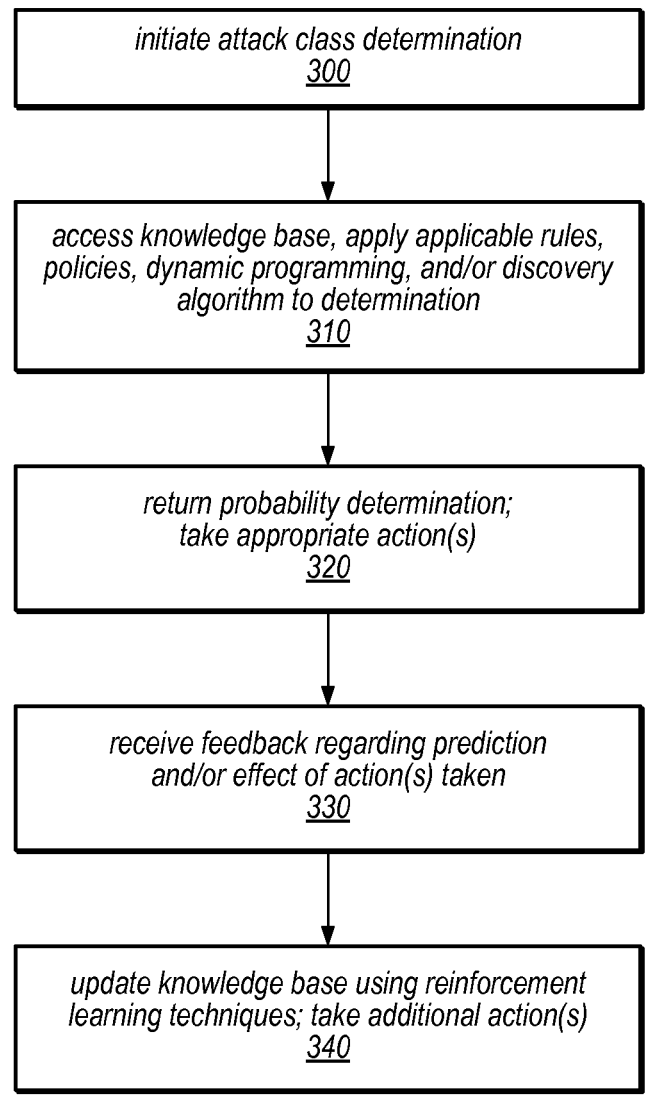
FIG. 3 is a flowchart illustrating a method for updating a knowledge base using RL techniques, according to one embodiment.

A method for applying reinforcement learning techniques to DDoS identification (e.g., attack class determination) is illustrated in FIG. 3, according to one embodiment. In this example, an attack class determination is initiated, as in 300. For example, an attack probability determination (e.g., execution of a membership function implemented in software, hardware, or a combination thereof) may be initiated in response to an information layer agent receiving one or more event messages from a data collection agent in a distributed system. As described above, the information layer agent may access a knowledge base and may apply applicable rules and policies to determine if the event indicates a known attack pattern or a previously unknown attack pattern, as in 310.

In the example illustrated in FIG. 3, the information layer agent returns a result of the determination, as in 320, and initiates the taking of appropriate action(s). Note that, unlike traditional attack identification techniques, the methods described herein may not return a binary classification of the observed behavior (e.g., a binary indication that the observed behavior is or is not representative of an attack), but may return an indication of the probability that an attack is in progress and/or is imminent in the distributed system. As described herein, this probability may be determined dependent on computations involving weighted parameter values (e.g., CPU usage, I/O usage, memory usage, resource trends), on workload profiles (e.g., this behavior is normal for this application, but not for that one), or other variables, and may involve identification of known attack patterns or a prediction that observed behavior is indicative of a previously unknown attack pattern, in some embodiments. For previously unknown attack patterns, the information layer may apply a clustering analysis in an attempt to classify the new attack pattern, as described in more detail below. The information layer may select a response to the new attack pattern based on this classification attempt (which may be refined later using RL techniques).

In the example illustrated in FIG. 3, feedback may be received regarding the accuracy of the attack class determination, as in 330. In some embodiments, agents on one or more nodes may continue to collect data after receiving an indication of a probable attack, and this data may be used to determine that an attack did or did not take place. For example, trend data collected on a suspected victim node may show that a sudden increase in resource usage did not constitute the beginning of a DDoS attack, but was merely a temporary spike in resource usage by an authorized application. In another example, data collected following an indication of a probable attack may show that an attack was, in deed, in progress, but that it was mitigated or otherwise contained through actions initiated in response to the attack prediction (e.g., by throttling back the available resources on victim nodes and/or potential victim nodes). In some embodiments, it may be possible for an information layer agent to autonomously determine whether an attack classification or prediction was accurate in 90% of cases or more, while any remaining predictions may be validated or invalidated through human interaction.

In this example, in response to feedback on the accuracy of the attack classification, the information layer agent may update the knowledge base, as in 340. In some embodiments, the information layer agent may apply reinforcement learning techniques, dependent on the received feedback, to tune the membership functions and/or other contents of the knowledge base relative to a known attack pattern, e.g., to modify parameter values (e.g., boundary values) reported to a membership function, to modify the number and/or type of parameters used in a membership function computation, to promote rules found to correlate well with actual attacks, or to demote rules found to correlate poorly with actual attacks, in different embodiments.

For example, RL techniques may be used to determine that one or more other parameters may be needed to better distinguish between "normal" behavior and an attack pattern, or distinguish between various attack patterns. In another example, RL techniques may be used to tune a membership function so that it maps a higher or lower attack probability value to a given state value. In various embodiments, the information layer agent may use reinforcement learning techniques to add information to the knowledge base relative to known attack patterns or to previously unknown attack patterns, as described herein. In some embodiments, received feedback may be used to update a confidence level associated with a membership function, to change the relative weighting of parameters used in a membership function computation, or to modify action(s) to be taken in response to known and/or unknown attack patterns to better mitigate or contain them. In some embodiments, received feedback may be used to modify the attack discovery/classification algorithm to be applied to the particular attack pattern, as described in more detail below. Note also that in response to receiving feedback about a state change due to actions taken at 320, the method may include taking additional action(s) at 340, according to current or modified policies and/or state-action value mappings.

Figure 4:
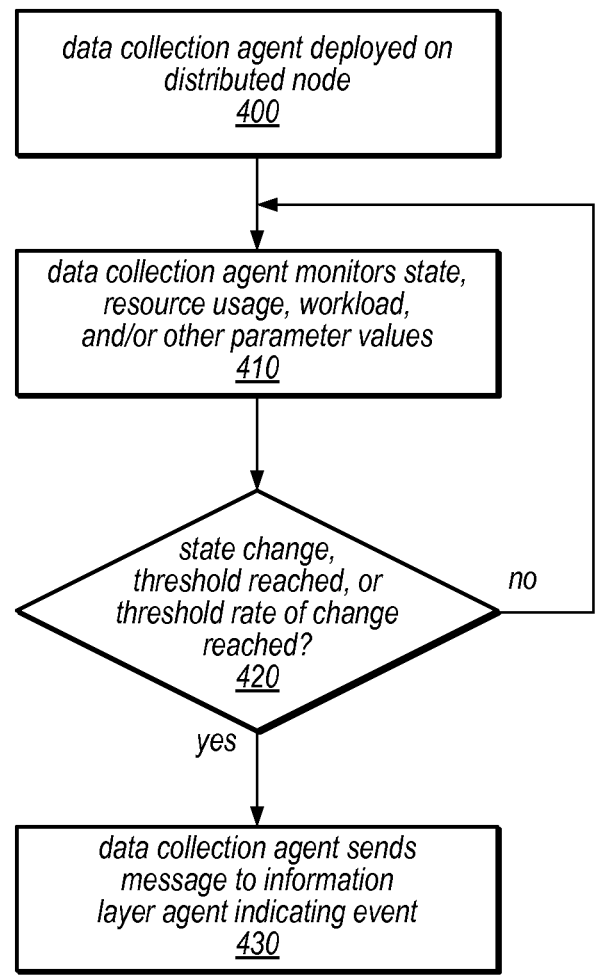
FIG. 4 is a flowchart illustrating the use of event driven messages, according to one embodiment.

As previously noted, data collection agents (e.g., sensors) may in some embodiments be deployed on the nodes of a distributed computing system, and may send messages to an information layer agent on the same or another node including an indication of an event relevant to the data they collect. FIG. 4 illustrates a method for this event-driven messaging, according to one embodiment. In this example, a data collection agent is deployed on a distributed node, as in 400. In some embodiments, a data collection agent may include a sensor or other hardware element, such as an FPGA, instead or, or in addition to various software elements. In some embodiments, a data collection agent may be deployed automatically on a node (e.g., a remote or mobile node) in response to the node being registered in the distributed computing environment.

In this example, the data collection agent monitors one or more of: a state of the node or of a process/thread executing thereon, resource usage and/or trends, a workload or throughput, or the values of other parameters, as in 410. For example, a data collection agent may collect data using one or more of: an mpstat command, an iostat command, or a vmstat command of the node's operating system, in one embodiment. As described above, the data collection agent may be configured to transform time series data (e.g., values returned by these commands over time) into discretely classified data, according to programmable (or otherwise dynamically configurable) boundaries. For example, in one embodiment, resource usage may be classified as "low" if it is between 0-30%, "medium-low" if between 30-50%, "medium" if between 50-70%, "medium-high" if between 70-85%, and "high" if between 85-100%.

As illustrated in FIG. 4, if the data collection agent detects a change of state (e.g., a transition from "medium-high" CPU usage to "high" CPU usage), a threshold value that is reached, or a threshold rate of change that is reached (e.g., in the case of a sudden, rather than an incremental change in resource usage is detected), it may send a message to the information layer agent indicating this even, as in 430. In other words, rather than collecting periodic samples and sending them in messages to the information layer, or sending periodic messages containing average values to the information layer, in some embodiments, only event-driven messages (e.g., on state transitions, or sudden changes) may be sent to the information layer for analysis. When no such threshold or state transition is detected, shown as the negative exit from 420, the data collection agent may continue to collect data until such an event is detected. This is shown in FIG. 4 as the feedback loop to 410.

In various embodiments, multiple categories of rules may be applied by data collection agents to determine if an event has occurred for which a message should be sent to an information layer agent. For example, in one embodiment, rules may be directed to CPU resource usage, I/O resource usage, memory usage, combinations of CPU resource usage, I/O resource usage and/or memory usage, or to trends in such usage. In some embodiments, events may be triggered dependent on an expected workload for a particular application. For example, the dynamic workload of a banking application may exhibit a standard profile appropriate for an online transaction load (e.g., with arrival times on the order of 1000/second) when operating normally, and the information layer agent may be configured to detect if the workload is very different from the expected profile and/or if the workload suddenly changes (e.g., if it suddenly increases to 5000/second). For example, if the expected workload for the corresponding nodes typically exhibits CPU usage="medium" when I/O usage="medium", but the observed parameter values indicate CPU usage="high" when I/O usage="medium," the information layer may apply a membership function to the observed parameter values and may determine that the probability of a CPU attack is 60%, in one embodiment. In some embodiments, the membership functions may be integrated with intelligence data (e.g., token based identity or other security mechanisms), and the intelligence data may be included as additional parameters in determining the probability of an attack.

Figure 5A:
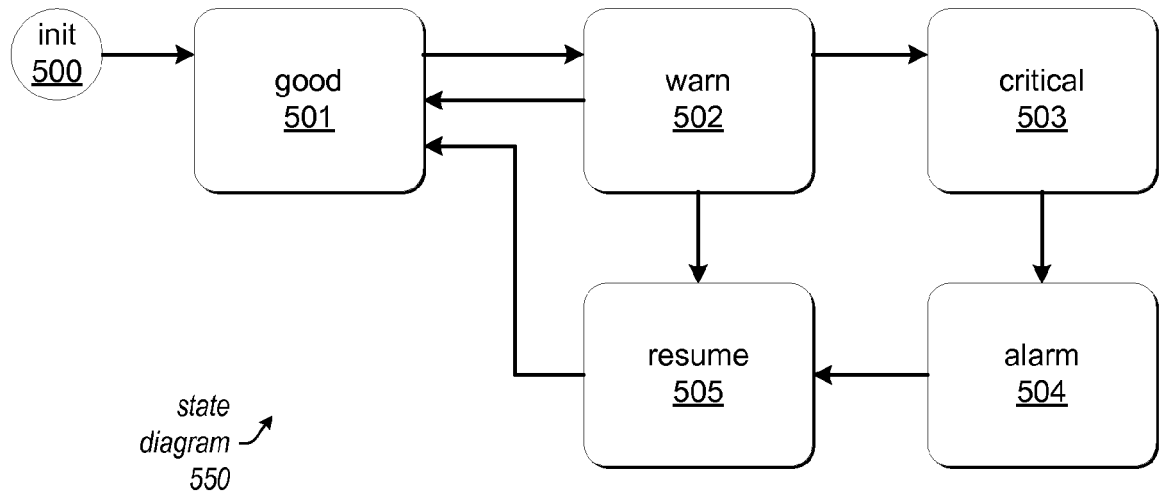
FIG. 5A illustrates a state diagram for a state machine used in attack detection and prevention, according to one embodiment.

FIG. 5A illustrates a state diagram 550 for a state machine that may be used by a data collection agent and/or information layer agent in a storage area network to determine if an event indicates a possible attack and/or to determine an appropriate response to the event, according to one embodiment. In this example, three bits may be used to encode the state of a node. In this example, the use of a state machine (e.g., observation of state transitions) may eliminate the need to store previous utilization information. In this example, the state machine may also be used to ingest stop attributes for a resource pool and may be used to resolve policy conflicts.

In the example illustrated in FIG. 5A, the state encodings may be as follows:

| | |
|---|---|
| 000 | GOOD |
| 001 | RESUME |
| 010 | WARN |
| 011 | ALARM |
| 100 | CRITICAL |
| 101 | INIT |

In this example, state transitions for an agent monitoring storage resources may be defined by the following pseudo-code:

```
if previous resource usage ≧ 70% and current usage < 70%
    Ingest Stopped
    Resume(x, Ingest)
    Emit(x, RESUME, logger)
if previous resource usage ≧ 70 and current usage < 70%
    Ingest Not Stopped
    Emit(x, GOOD)
if previous resource usage < 70% and current usage < 70%
    State(x, GOOD)
    No Rule for Overhead
if previous usage < 70% and current usage ≧ 70%
    Emit(x, WARN, logger)
    Remove(x, VTVs)
if previous usage ≧ 90% and 70% ≦ current usage < 90%
    Emit(x, ALARM, logger)
    Remove(x, VTVs)
if current usage ≧ 90%
    Emit(x, CRITICAL, logger)
    Stop(x, Ingest)
    Remove(x, VTVs)
```

In the example illustrated in FIG. 5A and described above, various notifications indicating the state of the monitored resource(s) (e.g., GOOD, RESUME, WARN, ALARM, or CRITICAL) may be sent in response to a state transition, as indicated in the "Emit" statements above. Other actions that may be taken in response to such state transitions include stopping ingest, resuming ingest, and removing a node (e.g., a virtual tape volume, as above, or another storage device or other instance of a distributed resource) from the allocation pool.

Figure 5B:
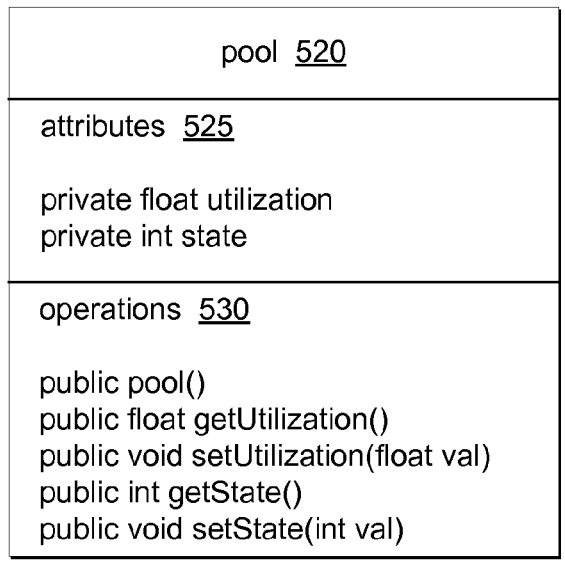
FIG. 5B illustrates an object representing a resource pool, according to one embodiment.

FIG. 5B illustrates the design of an object that in one embodiment may be used to represent such a resource pool, shown as 520. In this example, the object may include attributes 525 of the pool, including state and utilization. In this example, the object may include corresponding operations (e.g., methods) usable to observe ("get") and/or modify ("set") the state and utilization of the resource pool. State transition rules for the state diagram illustrated in FIG. 5A may be order sensitive, in some embodiments. For example, pseudo-code corresponding to the rules for this state machine may include:

```
Rule 1.1 Leave State 001, 010, 101, Enter State 000, Good Rule
    Pool (x) ∧ (State (INIT) ∨ State (WARN) ∨ State (RESUME)) ∧
        (Utilization (x) < 0.7 ) → State (GOOD)
1.2 Leave State 000, Enter State 010, Warn Rule
    Pool (x) ∧ State (GOOD) ∧ (Utilization (x) ≧ 0.7) → State
    (WARN) ∧
        Emit (x, WARN, logger) ∧ Remove(x, VTVs)
1.3 Enter State 100, Critical Rule
    Pool (x) ∧ (¬State (CRITICAL)) ∧ (Utilization (x) ≧ 0.9) →
    State (CRITICAL)
        ∧ Emit(x, CRITICAL, logger) ∧ Stop(x, Ingest) ∧
        Remove(x ,VTVs)
1.4 Leave State 100, Enter State 011, Alarm Rule
    Pool (x) ∧ State (CRITICAL) ∧ (0.7 ≦ Utilization (x) < 0.) →
    State(ALARM) ∧
        Emit (x, ALARM, logger) ∧ Remove(x, VTVs)
1.5 Leave State 011, Enter State 001, Resume Rule
    Pool (x) ∧ State(ALARM) ∧ (Utilization (x) < 0.7) →
    Resume(x, Ingest) ∧
        State (RESUME) ∧ Emit (x, RESUME, logger)
```

As previously noted, in some embodiments, a virtual overlay network (e.g., a mobile aware overlay detection network) may be constructed and used in attack tree discovery and flood control. Use of a virtual overlay network may in some embodiments minimize data transmissions between layers and/or across domains. The overlay network may include lightweight agents (e.g., for remote, small, and/or mobile devices), a distributed data structure for associating neighbor vertices, and an attack policy of flood control action mapping within an attack state space. A generic event drive model may be employed in the attack tree discovery and may be independent of layer 3 and 4 protocols. Workload learning, (e.g., based on Q learning), and fair share scheduling algorithms may be employed in attack tree discovery and/or flood control.

As noted above, in some embodiments, an event driven model may be established in order to probe the routes of the attack path discovery. In order to efficiently identify attack paths for launching attacks towards the targeted victim nodes, an asynchronous event driven model may be used, as described herein. In some embodiments, attack discovery packets may be asynchronous and reliable, and events may be eventually published or consumed within an expected time delay at a discrete time t. This discrete time may in some embodiments represent real time rather than virtual time. In other words, if an event occurs at time t, the probability of the same event occurring at t+δ goes to zero, where δ→∞. In some embodiments nodes may always begin asynchronously and may wake up their closest neighbors.

In one embodiment, a distributed environment may be represented as a set of computing resources located at the nodes of a network graph, G=(V, E). In this example, a vertex is a virtual environment identified within an attack tree that may be used as a bookkeeping data structure, and an edge is the attack path or knowledge to another attacked vertex. The edge between an attacked vertex u and another vertex v, where u,v∈V, may be represented as {u, v}. In this example, W may denote the attack, and may represent a finite set of processes for targeted resources $\langle p_1, p_2, p_3, \ldots p_4 \rangle$.

The weight, weight (i, j), of an attacked path may be computed as a function of the number of edges that a node has and the load of the node. The load may be represented as l(i, j), which may denote the shortest path between a vertex i and a vertex j in G, where i,j∈V. The load may also be quantified by the system characteristics via a neutral network. In this example, BAD may represent a finite set of virtual attacked nodes. A specific attacked environment may be utilized as a resource pool as it is assigned to the environment. An attacked environment may be created on a vertex.

{$b_1, b_2, b_3, \ldots b_n$}; for every i, 1≦i≦n, a set $b_i \in$BAD.

Figure 6:
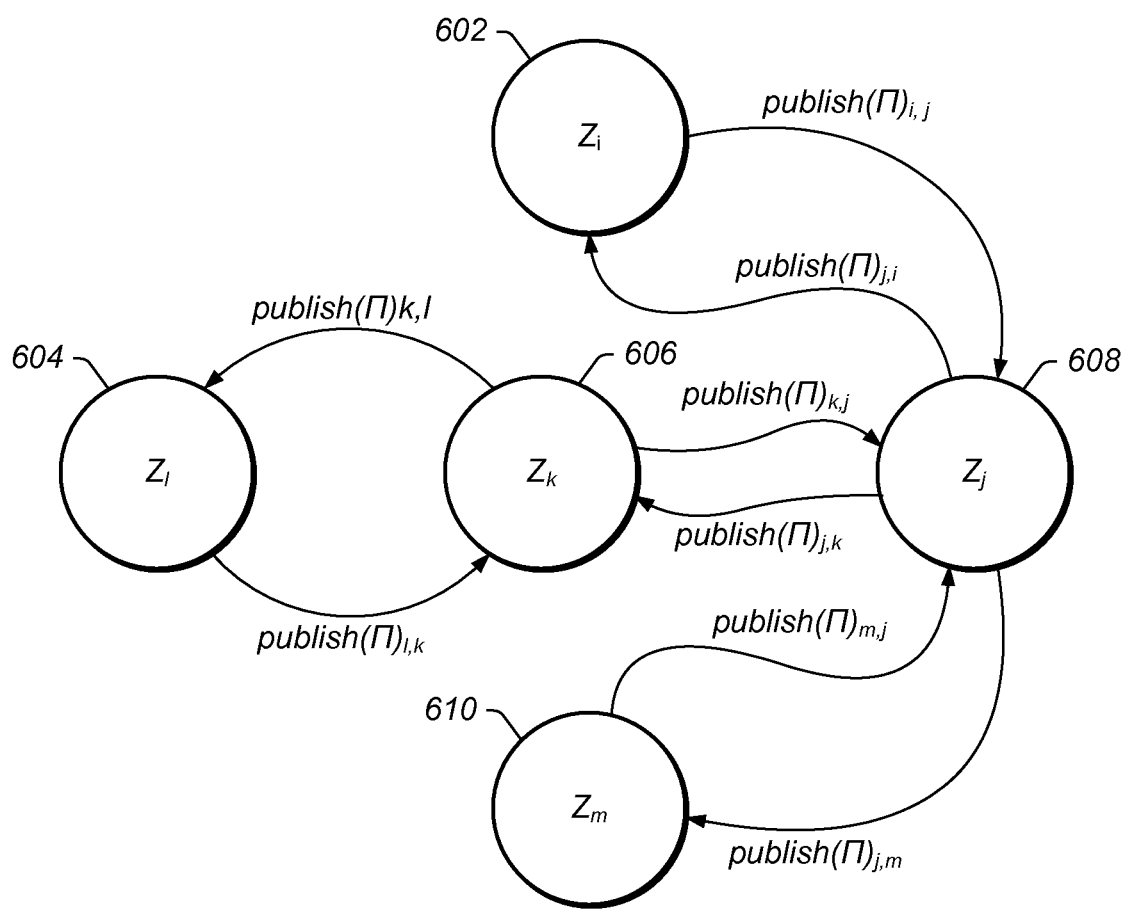
FIG. 6 is a data flow diagram illustrating attack tree discovery, according to one embodiment.

FIG. 6 illustrates an event driven model for attack tree discovery, according to one embodiment. In other words, FIG. 6 illustrates an overlay of a network graph, in which virtual environments $Z_i$, $Z_j$, $Z_k$, $Z_l$, and $Z_m$ are neighbors. In this example, a set of attack discovery LINK channels are used to process transmissions for set $\Pi_i$. In this example, an attack tree discovery process $dp_i$ may be associated with each node i, i∈V. In this example, a set of attack propagation events $\Pi_i$ may denote a policy mapping of flood control actions and state from victim nodes to the neighbors that have shared edges with the vertex i representing the victims. For every i, 1≦i≦n, a set $\pi \in \Pi$. Conceptually, an event may be thought of as a set of these actions. In this example, for an attack discovery action π, the output of the discovery action is formed as a non-blocking call publish $(\Pi)_{i,j}$ (shown in FIG. 6 as a path from 602 to 608), and the input of a discovery action may be formed as a non-blocking call consume $(\Pi)_{i,j}$ (not shown).

In the example illustrated in FIG. 6, a $msg_{i,j}$ (e.g., publish $(\Pi)_{i,j}$) may represent a discovery control packet over a LINK channel as an event π of the attack tree occurring over an edge i,j for triggering a state transition. Both a victim alert and an attack tree discovery message may initiate a state transition. Hence, as an event π occurs, a $msg_{MADP}$ may be denoted by an augmented BNF generic messaging set and the attack discovery protocol MADP.

An attack path discovery and classification algorithm may be configured to discover a set of virtual environments, referred to as BAD, in which a set of resources is attacked. The event driven model may represent event based control flow in parallel and/or distributed computing systems. In some embodiments, traditional communication packets may be modeled as events of flow control, and events may be triggered by messages passing between two processes or between threads within processes. Event based messaging may in some embodiments be based on a platform independent data exchange protocol, and established on platform neutral channels, such as a socket, pipe, named pipe, etc. In various embodiments, messages may be encapsulated within an event based data exchange in a synchronous or asynchronous mode. An asynchronous event messaging mode may facilitate a priority queue and scheduling that is scalable and allows good throughput in the case of a large-scale resource discovery, while decoupling message payloads with layer 3 and layer 4 protocols.

In some embodiments, a state transition may be triggered by a messaging exchange and/or by an intrusion alert, and attack discovery routing may be modeled to construct an event driven model for event publishing and consumption. The publication and consumption pattern may represent the life cycle of an event, as it is processed. To support mobility awareness of the messaging model, asymmetric communication links may be used in the event model, rather than traditional infrastructure based handshaking (e.g., bidirectional three-way handshaking using REQ, SYNC, and ACK). Within the overlay network, power nodes may act as routing nodes, even without dedicated mobile routers, in some embodiments. In such embodiments, overlay elements may deliver packets via a mobile Internet Protocol (IP) or dynamic host configuration protocol (DHCP) managed fixed infrastructure.

In one embodiment, a workload learning and fair scheduling algorithm operation may be defined over a parent node to generate an event (Π) as follows:

$node_{parent}$ ← parent ($node_i$), where $node_{parent} \in$ neighbors
Π $node_{parent}$ ← usage * α; where α ← $share_{active}$ | $share_{virtual}$
$w_{i+1}$ ← η w(w' − w); where 0 < η < 1

In this example, the step size, η, is the learning ratio used in adjusting an estimated weight of a node i from a previously estimated weight and the expected load of the node.

A policy action of the scheduling and planning algorithm may in some embodiments distribute the load of packet deliveries among the vertices along an attack path. The targeted nodes may be simultaneously and asynchronously requested to ensure fairness amongst the parties utilizing the resources. In some embodiments, two levels of sharing may be supported. On the top level, each virtual execution environment may compete for resource shares based on the ratio of the number of shares per execution environment and the total number of shares per node. In some embodiments, the ratio may be a deterministic factor for load allocation. In the example described above, the value of a flood control action a in an attack state s may be defined by a policy π, as follows:

$$Q^\pi(s,a) \leftarrow E_\pi\{R_t | s_t=s, a_t=a\}$$

In order to support a large population attack state space of unknown depth, a pervasive data structure may in some embodiments be used for computation procedure analysis and design. In such embodiments, as a victim node is alarmed, the attacked virtual environment $b_i$, where $b_i \in$BAD is sufficed with an efficient graph and tree algorithm via a discovery process $dp_i$ hosted on a victim vertex i where i∈V in G. In addition, the discovery process may communicate over the directed edges and have no foreknowledge about the size, diameter, and input distribution of the attack tree of a mobile ad-hoc peer-to-peer network.

In G, for a set of V, for which the size is |V|, a strategy may be applied in order to select a next node (represented using a bookkeeping data structure) to expand from a fringe (a set of explored nodes). The data structure may present a node including a state, parent node, action, path, cost, and/or depth.

Extending a graph tree, a formulated attack path discovery algorithm may be used to locate a set of paths to a victim node from which an attacker launches DoS attacks to overwhelm victim resources. In some embodiments, an attack tree discovery algorithm operation may perform a lookup of all vertices and some edges of a networking range, which may include a set of selected edges forming a tree spanning attacked vertices and paths. Each discovery process may ultimately return the parent routing nodes in an attack tree. Simultaneously, a Q learning plan may perform scheduling of a workload to suboptimal paths in order to implement a flood control mechanism. A distributed computing procedure may be further described (in pseudo-code) using the example task below:

```
DISCOVER-ATTACK (node_i) return done, cutoff
    if first-call then INIT-STATE (node_i)
    if node type is mode (node_i) then
        case
            victim node: result ← PUBLISH(Π)
        case
            edge node: result ← CONTROL(node_i)
        case
            both: result ← PUBLISH(Π) ∧ CONTROL(node_i)
    if !done ∧ !cutoff return failure
    return done
PUBLISH(Π) return done, failure
    m ← construct(Π)
    result ← publish(m)
    return result
CONTROL(nodei) return done, failure | cutoff
    for depth ← 0, goes → ∞ do
        if DEPTH(node_i) = depth then return cutoff
        else for each j neighbors do
            result ← LEARN-SHARE(node_j)
    return result
```

In some embodiments, a unique host identifier may be used in a naming scheme without knowledge of node indices within a neighborhood. To formulate parallelism, a state space may in some embodiments be distributed among processes. Using an unstructured graph, static partitioning may result in an unbalanced workload. This may be due to the variation of the partitions of a discovery space, and/or to overhead associated with assigning each process to each vertex. In one embodiment, the distribution may include partitioning a search space to each process with each disjoint vertex. In this example, as a goal node is identified, all processes may terminate the discovery.

An overlay network for attack discovery and flood control may in some embodiments sit on top of a physical network, and may cross VLANs, subnets, domains, etc., each of which may have their own policies. As noted above, such an overlay network may be applied at or above application layer 7, rather than at transport layer 2 or 3, in various embodiments.

Heterogeneous computing is one of the common characteristics typically found within mobile ad-hoc peer-to-peer task environments. Therefore, such environments require an attack discovery system that is adaptive to different hardware architecture platforms, operating systems, and mobile devices. In addition to the traditional end-to-end considerations in system design space, the fundamental issues of mobile ad-hoc peer-to-peer networks suggest design considerations that are applicable to a mobile attack discovery protocol (MADP). Traditional operating system-specific kernel space module analysis and design on vendor-specific platforms are challenged by the above requirements. Hence, a layer 7 distributed attack discovery methodology and flood control analysis, as described herein, may be well suited for attack identification and prevention in such environments. In some embodiments, bit operations may be applied in the system design. By aligning these system designs with the algorithmic operations design, a variety of programming languages (e.g., from advanced languages to firmware) may be adopted for implementation. For example, in some embodiments, the Java™ programming language may be adopted. In some embodiments (e.g., those in which the variability of infrastructure security policies may be a concern), an attack tree discovery protocol design may be implemented using an extension of HTTP 1.1 for event communications and exchanges via firewall policies, and normal UDP tunneling along core, edge or source routing and processing nodes.

To enable a mobile attack discovery agent (MADA) on a mobile node, a carrier may send short messages to mobile subscribers. In this way, a MADA may be deployed to a mobile device. In some embodiments, a MADA may be a MIDP 2.0 compliant application. In such embodiments, upon completion of a download, a content delivery service may be used to notify a routing node within an overlay network. As the MADA is enabled on a mobile device, the node receiving a notification may advertise its presence to a MADA via a mobile attack discovery protocol (MADP). As previously noted, MADP may be implemented as an extension of HTTP 1.1, support of which is mandatory for any MIDP compliant application. A MADP event message inherits the HTTP 1.1 message headers within a message body. Thus, a mobile node hosting a MADA may be invited to participate in an overlay network for a mobile attack discovery. In some embodiments a mobile node may manage the life cycle of a MADA. In such embodiments, as a specific victim event is alarmed, a MADP event message may be initiated for an attack tree discovery. For a large population attack discovery, both a synchronous protocol (e.g., according to the synchronous nature of HTTP) and asynchronous attack identification and flood control may be designed and implemented. Specifically, an asynchronous attack tree discovery may be performed through a push of notifications upon a path discovery of a result set, or by polling of an identification message of a resource resolution, in different embodiments. As a path expansion, a Q learning and a fair share scheduling based policy action may control a flood attack in order to ensure the resilience of the system in response to a DoS attack.

In some embodiments, if a MADA accepts an invitation from a node within an overlay network, it may join the overlay network. When a MADA joins the overlay network, a virtual node (VNode) may be created on the node that originated the invitation (e.g., a more powerful node than the mobile devices on the network). Conversely, a mobile node may in some embodiments leave the overlay network by powering off or by disabling the MADA service, in different embodiments. A mobile node may in some embodiments understand its current location within an overlay network according to the node hosting the associated VNode. In some embodiments, a VNode on the overlay network may be used for learning and planning of packet scheduling.

In general, a dynamic attack detection overlay environment may be formed for a large-scale distributed attack discovery in an environment with distributed processor, memory, disk and/or I/O allocations. However, the proposed MADA differs from traditional DDoS systems in part in that it may serve as a truly distributed attack discovery mechanism, rather than as a central defensive approach. In some embodiments, a MADA may virtualize mobile nodes within an overlay network in order to reduce the cost of an attack tree search and to ensure survivability during the disconnections from learning for scheduling.

Figure 7:
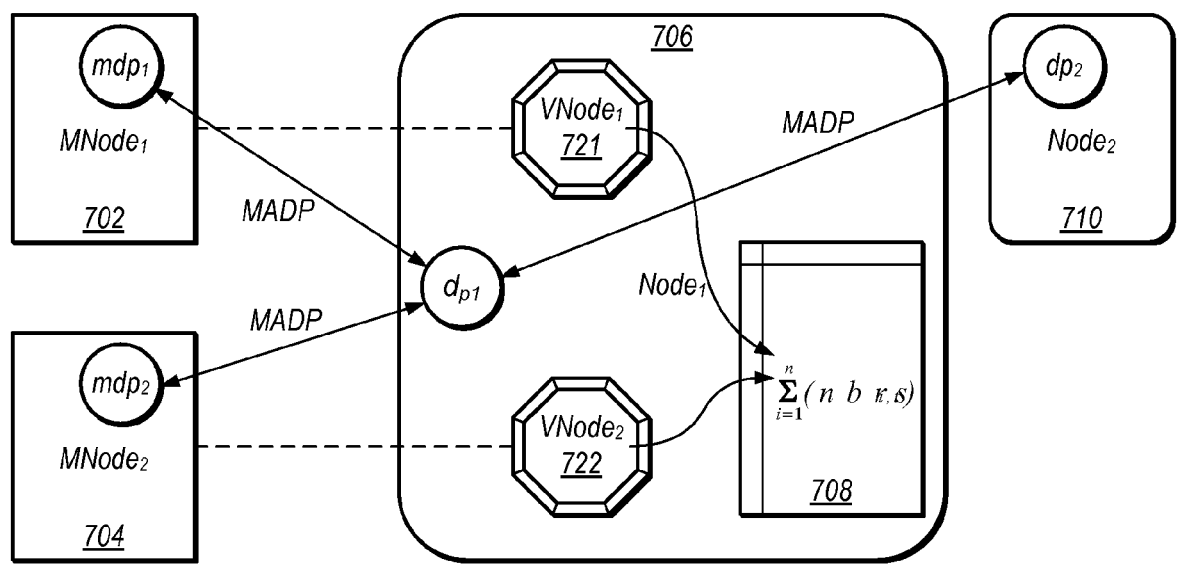
FIG. 7 illustrates an overlay network of a distributed computing system, according to one embodiment.

FIG. 7 illustrates the logical architecture of a detection overlay network, according to one embodiment. In this example, mobile nodes 702 and 704 have joined an overlay network 706, and are represented therein by virtual nodes 721 and 722, respectively. In this example, data structure 708 may represents a mapping of the nodes of the overlay network and their neighbors. In this example, mobile nodes 702 and 704 include mobile discovery processes $mdp_1$ and $mdp_2$, respectively, while Node2 includes a discovery process $dp_2$.

Figure 8:
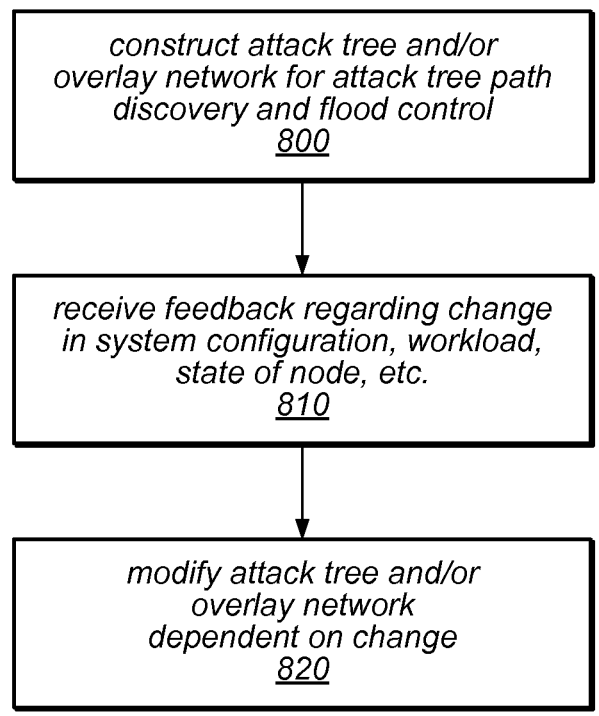
FIG. 8 is a flow chart illustrating a method for updating an attack tree or overlay network using RL techniques, according to one embodiment.

Unlike with previous machine learning approaches to intrusion detection, the system and methods described herein may not assume a static architecture (e.g., one having a fixed topology with a fixed number of input nodes, output node, and hidden nodes). FIG. 8 illustrates a method for modifying attack trees and/or overlay networks, according to one such embodiment. In this example, an attack tree and/or overlay network may be constructed for a given distributed system (e.g., a grid computing environment, mobile ad-hoc network, etc.), as in 800. For example, an initial attack tree and/or overlay network may be constructed based on a known, expected, or assumed system configuration, a known or assumed workload, on simulation or training data, or arbitrarily, in different embodiments. At some point, the system may receive feedback indicating a change in the system configuration, the workload, and/or the state of one or more nodes in the system, as in 810. For example, event driven messages received from data collection agents, or messages received in response to an attack class discovery probe may indicate that a node has been attacked, added, or shut down, or that the workload has increased or decreased, or otherwise exhibits a change in its characteristics. In response to this feedback, the system may be configured to automatically modify the attack tree and/or overlay network for the system, dependent on the change, as in 820. In some embodiments, reinforcement learning techniques may be applied to the building and updating of attack trees and/or the overlay networks used in attack discovery and/or flood control. For example, when the value of a state of one of the nodes of the system changes, a state-action value mapping for the system may indicate that a change should be made to the attack tree and/or overlay network With common infrastructure constraints, a fixed infrastructure based on layer 3, 4, and multi-cast protocols may not be suitable for use in mobile ad-hoc networks due to firewall policies and other security restrictions. In addition, even within a fixed infrastructure network, a multi-cast protocol may not be scalable to a large space attack tree discovery due, e.g., to the overhead of event messaging and limited bandwidth. On the other hand, HTTP is an infrastructure friendly protocol and a universal protocol supported by a majority of mobile devices and data center computation resources from high-end servers to low-end desktop computers, laptop computers, routing devices, and PDAs. Therefore, in some embodiments, MADP (a distributed attack tree discovery protocol) may be implemented as an extension of HTTP 1.1, using an attack discovery specific defined message header and body that are embedded within an HTTP message body. In some embodiments, HTTP POST methods may be used to transmit packets over mobile networks. In some embodiments, MRDP 1.0 may be used as a synchronous and an asynchronous event messaging protocol in order to serve a large population of attack discovery network. An event message exchange for an attack tree discovery life cycle may include the following: agent invitation, node registration, re-registration, attack alert, and discovery.

In some embodiments, the MADP may use a "<major>.<minor>" numbering scheme to indicate protocol version control. In such embodiments, adding event components without the impact of communication behavior may not cause a version update. In one embodiment, the <major> number may be incremented in the case of format change of an event within the protocol, and the <minor> number may be incremented when a change may add to the event semantics and/or when it indicates additional capabilities of a sender.

In some embodiments, MADP events consist of two preliminary event types, which represent the requests from publishers to consumers and responses from consumers to publishers. These events may be specified using an augmented BNF format, as shown below:

MADP-event=request; MADP/1.0 events

Both publisher and consumer messages may use a generic event model to transmit the payload of a message. An event may be composed of a header and an event body. Since in some embodiments a MADP is decoupled with the transport layer, a BNF event definition may be applicable to HTTP, UDP, etc. A MADP 1.0 event may be embedded within an event body of a generic event format. A robust MADP event publishing may ignore any empty line received as it being processed (i.e., as it is reading a protocol stream). A sequence ID may be utilized for an event tracking. A check sum may be used for an integrity check over energy saving nodes. A MADP/S may be built upon a secure socket based transport layer security. A sample attack alert event is shown using the pseudo-code below:

```
event-body = (victim-address, event-lifetime, seq, reserved)
    victim-address = *OCTET
    event-lifetime = *OCTET
    seq = *OCTET
    reserved = *OCTET
    OCTET = <any 8 bit sequence of data>
```

Anomaly attacks are stochastic processes, which may generate random state transitions of information structure. Attack prevention may involve observation of relative abrupt changes, which are stochastic within an infinite time horizon. In the setting of dynamic task environments, attack prevention is a dynamic problem, which may be further formulated as either an objective function parametric optimization problem or a dynamic action state control optimization problem.

Parametric function optimization can be easily implemented for function evaluation with fixed parameters. However, parametric function optimization may lead to high dimensionality, and searching over the entire solution space may result in slow convergence. Also, control optimization may need to be incorporated in the middle of trajectories. Furthermore, each problem may present it own challenges. Prevention actions and associated state changes form a stochastic decision process, which is usually probabilistic. With such memory-less properties, intrusion prevention may in some embodiments be modeled as a class of control optimization problems with a semi-Markov model. Therefore, autonomous prevention may be thought of as a state-action control optimization problem to dynamically locate an optimal action in each state in the system. Since it is a memory-less process, each state transition probability may be independent of previous states but not of current state. In addition, the transition time may not employ a unity time step.

In real systems, state transition probabilities and reward discount factors may be unknown or may be hard to compute. Without transition probability matrices (TPM), transition reward matrices (TRM), and transition time matrices (TTM) as the cornerstones of a theoretical model, autonomous prevention may be difficult to formalize as a traditional Markov Decision Problem (MDP), which can be solved by DP algorithms. Objective prevention function may have high dimensional random decision variables in a large state space. It may be hard to obtain the probability mass or distribution function of these parameters. Furthermore, a given a distribution function may not have closed form solutions. With distribution of inbound, random system decision variables, estimated transition probability and reward matrices may generate TPMs and TRMs via simulators. The solution may not scale to large state and solution spaces. For large state spaces, state-aggregation may be required to approximate the model with a manageable number of states.

The goal of autonomous attack prevention is to sense and evaluate abrupt changes with fixed or dynamic minimal average delay to minimize the false alarm ratio. As rewards are returned as feedback to a SMDP task environment, the autonomous methods described herein may be used to predict resource contention and dependability to ensure service survivability. Hence, achievement of the goal may in some embodiments be dependent on performance metrics: the rate of false alarms, the intrusion detection rate, and the delay of detection. An augmented receiver operating characteristic (ROC) curve may be used to model the delay of detection. For an infinite horizon problem, a long run average reward may be used as a performance metric. A relaxed version of the problem may result in a minimum average delay of detection actions for a given fixed false alarm rate.

In one example, an MDP for a single agent may be modeled by a quadruple (S; A; R; T) consisting of:

A finite set of states S; where s∈S
A finite set of actions A; where a∈A
A reward function c: S×A×S→R
A state transition function: T: S×A→PD(S), which maps the agent's current state and action into a set of probability distribution over inputs.

States Q:
$x_1$: type of machine learning networks
$x_2$: input nodes of learning networks
$x_3$: output nodes of learning networks
$x_4$: hidden layer of learning networks
$x_5$: numeric weight matrix of learning networks
$x_6$: Q factors of ROC values This conservative state-space definition satisfies the semi-Markov properties. However, it may result in a state space that is too large to approximate in practice. With RL optimization, prevention rewards may be treated as state values learned by interactions. Therefore, with RL methods, optimal policies may be reached without an explicit search over all possible sequence of states and actions. Hence, dynamic prevention problems may be resolved with large and even infinite space with function approximation, in some embodiments. Consequently, the dynamic prevention problem may be formulated as an RL and DP based SMDP problem with model-free prevention function approximation. In some embodiments, the attack classification problem may be divided into two sub-problems (e.g., attack prediction and attack class discovery), as described below.

Attack class prediction may be used to map a discrete attack feature space to labeled attack classes. Specifically, the attack class prediction problem may involve assigning data samples to a specific class category. In some embodiments, this class prediction problem may be formulated as a computation problem to derive class predictors for unknown classes from those of known classes using machine learning in the task environment.

In some embodiments, a task environment may exhibit the following properties with respect to attack class prediction:

The class prediction process may include a set of training samples.
Classification may be completely dependent on the current feature extraction and attribute values. Therefore, the task environment may be deterministic.
The task environment may be a discrete task environment having a set of discrete training and incoming datasets.
The class prediction process may in some embodiments be dependent on the following properties:

state: A classification state specified by sc/as, specifically, the classification assignment of a data sample into a labeled class type.
performance: An augmented ROC curve (e.g., augmented to include the delay of prediction) may be used for machine learning performance measurement.

In one example, the problem formulation may be dependent on the following properties:

states: A finite set of feature extracted training samples with attack attribute values. For a sample dataset of size k, there are 42×k possible predictors for the learning attack classification state space. Since the ratio of dimensionality is k÷42, this represents a large sample of medium dimension. In some embodiments, the class prediction problem may be divided into two sub-problems: an attribute or instance selection problem, and a predictor learning problem. The attribute selection problem may involve discovery of the attack features, which may be strongly related to class distinction. Consequently, the class prediction problem may be transformed into an instance or attribution selection problem, and a learning prediction upon the selected samples.
initial state: In this example, there are 75 MB attack attribute values for 42 attribute samples. In this example, 4 labeled classes for the samples are itemized within Attribute-Relation File Format (arff) files.
goal state: Classification predictors have been discovered and a classification model has been to categorize the samples into the classes.
Goal Test( ): The classification should align the performance function with the ROC curve. For convenience, AUC, the area under the ROC curve, is selected for performance measurement. The AUC should be greater than 09.
Classification Cost: This may represent the delay associated with algorithmic complexities.

The class prediction problem may in some embodiments be formulated as an attribute selection problem and a predictor learning problem upon selected attributes of large samples with medium dimensionality. Large samples may be used to learn and test the prediction.

Attack class discovery by attack attributes may in some embodiments involve the classification of samples into different groups. The training datasets may be partitioned into sub-sets so that each cluster shares common traits, which may be represented by extracted feature sets. Attack class discovery may involve the grouping of data samples into specific class categories that represent not only current data clusters but also unknown classes. In some embodiments, this attack class discovery problem may be formulated as a computation problem to derive cluster predictors for unknown classes from those of known classes.

In some embodiments, a task environment formulation may be associated with the following environment properties:

The clustering process has a set of percepts and training samples.
Since clustering is completely dependent on the current feature extraction and attack attribute values, it is a deterministic task environment.
The environment is a discrete task environment with a set of discrete training and incoming datasets.

In some embodiments, goal formulation may be associated with the following goal properties:

state: A clustering state specified by $s_{cluster}$. Specifically, this may represent the cluster classification of given data samples into groups.

performance: The receive operating characteristics (ROC) curve has been proposed in literature for machine learning performance measurement. In some embodiments, an ROC curve augmented to include the delay of prediction may be employed.

In one example, the problem formulation may be dependent on the following properties:

states: A finite set of feature extracted training samples with attack attribute values. For a sample dataset of size k, there are 42×k possible predictors for the learning attack classification state space. Since the ratio of dimensionality is k÷42, this represents a large sample of medium dimension. In some embodiments, the class prediction problem may be divided into two sub-problems: an attribute or instance selection problem, and a predictor learning problem. The attribute selection problem may involve discovery of the attack features, which may be strongly related to class distinction. Consequently, the class prediction problem may be transformed into an instance or attribution selection problem, and a learning prediction upon the selected samples.

initial state: In this example, there are 42 attribute values of samples. The labeled classes for the samples may be listed within the arff files.

goal state: Classification predictors have been discovered and a classification model has been to categorize the samples into the classes. Possible unknown types are identified, along with the proposed algorithms and data structures.

Goal Test( ): The clustering should align the performance function with the ROC curve that is greater than 09.

Clustering Cost: This may represent the delay associated with algorithmic complexities.

Class discovery may be formulated as instance or attribute selection problem and a cluster learning problem upon selected attributes of small samples with high dimensionality.

For prevention action control optimization, MDP techniques may yield optimal solutions on a control optimization problem, and may be employed along with additional non-linear-programming methods in stochastic dynamic programming (e.g., value and policy iterations). However, for a complex system, it may be difficult to construct the theoretical model required for MDP formulation. In some embodiments, RL techniques may be employed in choosing a scheme for function approximation, as described in more detail below.

As a random variable, the expected immediate reward of a state transition with action a from state $s_i$ to state $s_j$ may be defined as:

$$\bar{r}(s_i; a) = E[r(s_i; a)] = \sum_{si \in S} p(s_i; a; s_j) r(s_i; a; s_j)$$

In this example, p(si; a; sj) represents the long run transition probability from state $s_i$ to state $s_j$ when MDP is running with action a selected in state $s_i$, S denotes a set of decision states in the sample space, and r($s_i$; a; $s_j$) represents the immediate reward earned from state $s_i$ to state $s_j$.

If a deterministic stationary policy π is followed, π ($s_i$) is the action that will be selected in state $s_i$. The average reward associated with policy π may be derived as:

$$\bar{r}\pi(s_i) = E[r(\pi(s_i))] = \sum_{si \in S} p(s_i) r(s_i, (\pi(s_i))$$

In this example, π represents an n-tuple associated with n states, p($s_i$) represents the infinitely long run transition probability of state i when MDP is running with the policy π followed, S denotes a set of decision states in the sample space, and under policy π(si), r($s_i$; π($s_i$)) denotes the expected immediate reward earned in the state $s_i$ when action π($s_i$) is selected in state i.

Using the above equation, optimal policies may in some embodiments be evaluated with the maximum rewards. Therefore, the performance objective function described above may provide a conceptual model for control optimization. To identify the optimal action value and associated policy, the transition probability matrices and transition reward matrices associated with each policy may be computed to evaluate the objective performance metrics resulted from each policy. This may limit the solution to small state spaces due to the exponential computation for mn (i.e., n states and m actions in each state) introduced by the conceptual model described above. To optimize controls, DP algorithms may be used to solve the MDP problems, in some embodiments. For example, by solving Bellman equations, the value components of a value function vector may be utilized to locate the optimal actions or policies. Various forms of Bellman equations may be used to resolve MDP problems, in different embodiments. The Bellman equation for a given policy in the average reward context may require k iterations of evaluation on linear equations in which each policy is selected in the iteration to derive the optimal policies. Value iteration is another form of Bellman equations that may not require solving any equation. Therefore has evolved as a pillar of RL algorithms.

From Bellman optimality equation for average reward:

$$V^*(s_i) = \max_{a \in A(s_i), s_j \in S} \left[ \bar{r}(s_i, a) - \rho^* + \sum_{s_j=1}^{N} p(s_i, a, s_j) V^*(s_j) \right]$$

In this equation:

A($s_i$) denotes the finite set of actions taken in state $s_i$ followed by policy $\vec{\pi}$ V*($s_i$) denotes the element of value function vector $\vec{V}$ associated with optimal policy for state $s_i$ p($s_i$, a, $s_j$) denotes the transition probability from state $s_i$ to state $s_j$ under action a.

$\bar{r}$ ($s_i$, a, $s_j$) denotes the expected immediate reward in state $s_i$ as action a is taken ρ* denotes the average reward associated with the optimal policy.

To resolve the value bound problem, relative value interaction may be employed. In the $k^{th}$ interaction:

$$V_{k+1}(s_i) = \max_{a \in A(s_i), s_j \in S} \left[ \bar{r}(s_i, a) - \rho^* + \sum_{s_j=1}^{N} p(s_i, a, s_j) V_k(s_j) \right] - V^*_{k+1}(s_i)$$

In the setting of non-unity transition times, relative value interaction was proposed. In the $k^{th}$ interaction:

$$V_{k+1}(s_i) = \max_{a \in A(s_i), s_j \in S} \left[ \bar{r}(s_i, a) - \rho^* t(s_i, a, s_j) + \sum_{s_j=1}^{N} p(s_i, a, s_j) V_k(s_j) \right] - V_{k+1}^*(s_i)$$

In this equation, $t(s_i, a, s_j)$ denotes the transition time from state $s_i$ to state $s_j$ followed by policy $\vec{\pi}$ with action $a$ taking place. The equation above indicates that the maximum value V* selection may run away from regular value iterations with deterministic optimal path location.

The above interactive conceptual model requires intensive computation. In addition, it requires a theoretical model. From RL literature, a provable convergent approach has been developed for learning optimal policies in continuous state and action spaces under average rewards. This technique has been applied to research with non-trivial configurations. However, there is no existing discussion on RL and optimization within the search state and action space. The methods described herein may employ self-organization of an index structure for state-action value mapping for search function numeric method approximation.

Optimization of intrusion prevention may in some embodiments be used to tune an initial prevention network with arbitrary network parameters and architecture. The objective of this tuning may be to obtain the approximate optimal architecture with a given input vector for a specific attack. The number of resulting networks may depend on the average reward and long-term cost of the detection optimization. In various embodiments, it may be implemented as both an online and an off-line incremental learning method to optimize the traditional neuron based detection techniques. The tuning may be thought of as a reinforcement learning problem for optimizing neuron architecture. These methods may exhibit the characteristics, "dynamic" and "autonomous", as discussed below:

Dynamic: Since intrusion prevention may formulate the detection as a stochastic DP problem, it may exhibit dynamic properties.

Autonomous: To handle large state spaces and unknown attack types, the DP problem may be transformed into an RL based autonomous tuning problem (i.e., autonomous in terms of interactively tuning the networks with programmable architecture, algorithms and data structures).

Data Reduction: To tune large data instances with medium to high dimensional attributes, a random subset of sample instances may be selected by tenfold extraction to avoid biased filtering. In addition, to search the space of attribute subset, greedy hill-climbing may be augmented with a backtracking feature utilized for correlation based reduction. This data reduction technique may result in a speedup of detection convergence over other methods.

Dynamic programming algorithms may require computation of a theoretical model of a system based on transition probabilities, transition rewards and transition times. These quantities may be unknown or difficult to evaluate. Specifically, to obtain transition probabilities, multiple integrals with the probability distribution functions of many random variables may be involved in the calculation on a complex stochastic system.

Both DP and RL algorithms may have a dependency with $$\sum_{x \leq t} p_x(x),$$

the distributions of the random variables that govern the system behavior for a time interval t. For continuous random variables, $$\int_{-\infty}^{X} f(x) dt$$

may be applied. However, RL techniques may not require the above theoretical model quantity evaluation or estimations, but may simulate the system using the distributions of the governing random variables. For autonomous search, the technique may require the distribution of random decision variables.

RL techniques may provide near optimal solutions without evaluation of the above quantities. As with DP techniques, one element of a value function vector may be associated with each state variable. An RL search algorithm may associate each element of the value mapping vector with a given state-action pair (i, a) as Q (i, a) for a search cost or reward evaluation in order to derive optimal polices.

Value iteration algorithms do not compute the system of linear equations. However, value iteration for MDP may pose difficulties for Bellman optimality equation computations having an unknown value of the average reward ($\rho^*$). For SMDP, the average reward context may involve an approximation solution space. However, regular DP value iteration may become unbounded for average reward MDP. Hence, relative value iteration may keep the operation bounded. Due to the discounting factor, which may be hard to measure in the real world, average reward tends to be a more popular performance measure.

In some embodiments, feedback may take the form of a discrete environmental signal. In such embodiments, after each action, the learning agent may receive immediate feedback from the task environment. In one embodiment, the immediate reinforcement reward signals $r \in R$ may be as follows:
  r=a A penalty resulted from a wrong action
  r=b A reward is granted as a target is learned
  r=c The goal state is reached
  r=−1 The cost of any action during learning
  r=0.0 The default feedback signal for all non-terminal states As shown in the example above, moving toward the target may be less costly than the absolute value of moving in the wrong direction, since keeping an agent in a valid task environment may be more important than getting to the target ($|a|>c>b$). Conceptually, the agent needs to learn to achieve the goal without rewards. In other words, the absolute value of the penalty should be significantly larger than the reward from the excepted move. The agent may be required to stay in the task environment to move toward the goal state. However, the sooner an action is rewarded, the sooner the agent may learn. In some embodiments, the cost of moving may be measured by a negative unit reward from the task environment. It may be larger than the reward from getting to the correct position, so that the steps considered in the search evaluation achieve the minimized path ($0<b<c<1$).

To further relax the large stages, an infinite horizon problem may be used to represent an approximation. For large state space, value-mapping vectors may not be stored explicitly, but function-approximation may be used to solve the high dimensionality problem during RL value iterations. If the time spent in a transition is not unity, the average reward per unit time over an infinite time horizon may be defined as:

$$\rho = \lim_{k \to \infty} \frac{E\left[\sum_{i=k}^{k} r(x_i, \pi(x_i), x_{i+1})\right]}{k}$$

From the Bellman optimality equation for average reward:

$$V^*(s_i) = \max_{a \in A(s_i), s_i \in S} \sum_{s_j=1}^{N} p(s_i, a, s_j)[r(s_i, a, s_j) + V^*(s_j)]$$

where $V^*(s_i)$ denotes the element of value function vector $\vec{V}$ associated with optimal policy for state $s_i$ $p(s_i, a, s_j)$ denotes the transition probability from state $s_i$ to state $s_j$ under action a.

$\bar{r}(s_i, a, s_j)$ denotes the expected immediate reward in state $s_i$ as action a is taken From Robbins-Monro algorithm, value and state-action mapping vectors in the Bellman equation may be defined without the dependency of transition probability:

$$Q(i, a) \leftarrow (1-\alpha)Q(i, a) + \alpha\left[\gamma(i, a, j) + \max_{b \in A(j)} Q(j, b)\right]$$

To resolve the divergent iteration problem of traditional Bellman optimality equations and associated DP algorithms, a relative value function proposition may be utilized.

$$Q(i, a) \leftarrow (1-\alpha)Q(i, a) + \alpha\left[\gamma(i, a, j) + \max_{b \in A(j)} Q(j, b) - Q(i^*, a^*)\right]$$

In this equation, a state-action pair (i*, a*) may be selected arbitrarily.

Since the discounting factor is usually unknown in real world problems, and taking transition time without unity into consideration, it may be difficult to apply the Bellman equation to value iterations with unknown average reward of the optimal policy $\rho^*$ without normalization of SMDP. However, by estimation of $\rho$, the above equation may be given as:

$$Q(s_i, a) =$$
$$(1-\alpha)Q(s_i, a) + \alpha\left[\gamma(s_i, a, s_j) - \rho t(s_i, a, s_j) + \max_{b \in A(j)} Q(s_j, b) - Q(s_i^*, a^*)\right]$$

In one embodiment, a dynamic machine learning detection algorithm, as described herein, may be implemented, at least in part, using program instructions similar to those illustrated by the pseudo-code below.

```
DYNAMIC-DETECT (s, a, limit)
    Description: Dynamic detection with learning network
        function approximation
    INPUT: state space, action space and maximum iteration jumps
    OUTPUT: solution to the problem
    S_sub, A_sub ← SUB-SPACE (S, A)
    INIT-FACTORS (S_sub, A_sub, limit)
    for each k in k_max do
        LOCATE-ACTION (S, A, Q)
        r_si,a,sj, t_si,a,sj ← PROBE(s_i, a, s_j)
        SIMULATE-ACTION (r_si,a,sj, t_si,a,sj)
        UPDATE-ACTION (Q (s_i, a), A)
        TUNE-LEARNING (Q (si; limit), A)
        LOCATE-POLICY (Q (s_i, a))
    return maxQ (l, b)
```

The methods called by the dynamic detection method above may in one embodiment be implemented, at least in part, using program instructions similar to those illustrated by the pseudo-code below.

```
TUNE-LEARNING (s_i, limit)
    Description: Tuning learning network function approximation
    INPUT: state space, action space and maximum iteration jumps
    OUTPUT: solution to the problem
    w(i) ← RANDOMIZE( )
    SSE_old ← 100000000000f
    tolerance ← RANDOMIZE( )
    for each m in N do
        for each j in k do
            o_p ← o_p + w(j) * x_p(j)
            w(i) ← w(i) + α * o_p
            α ← A/m
            m + +
        if (SSE-SSE_old < limit)BREAK
INIT-FACTORS (s, a, limit)
    Description: Initialize values and state-action mapping,
        visiting factors for state
        space S
    INPUT: state space, action space and maximum iteration jumps
    count ← max(length[S], length[A])
    for each s_i in count do
        Q (s_i, a_i) ← 0
        Visit (s_i, a_i) ← 0
    k ← 0
    α ← 0.1
    total_reward ← 0
    total_time ← 0
    ρ ← 0
    φ ← 0
    k_max ← limit
LOCATE-ACTION (s, a, Q)
    Description: locate action with maximum Q factor value starting from
        state s_i, randomly select action a
    Input: state space, action space and Q factors
    Output: action a that generates maximum Q factor
    s_i ← RANDOMIZE(S)
    a_i ← RANDOMIZE(A)
    for each a_i in Q do
        if Q(s_i, a_i) == max(Q (I, A))
            φ ← 0
            return a_i
    φ ← 1
    return NIL
SIMULATE-ACTION (r_si,a,sj, t_si,a,sj )
    Description: Simulate action a
    Input: immediate reward from action a, transition time from state s_i
        to state s_j
    Visit (s_i, a) ← Visit (s_i, a) + 1
    k ← k + 1
    α ← A/V (s_i, a)
UPDATE-ACTION (Q (s_i, a), A)
    Description: Update State-Action Value Mapping
    Input: State-Action Value Mapping
    Output: updated State-Action Value Mapping
```

-continued

```
Q (s_j, a) ← (1 – α) Q (s_j, a) + α [r_{si,a,sj} –ρt(s_i, a, s_j) + max (Q (s_j,A))]
return Q (s_j, a)
LOCATE-POLICY (Q (s_i, a))
    Description: Locate a policy with optimal State-Action Value
    Mapping
    Input: state space
    IF (φ == 0)
        THEN
            total_reward ← total_reward + r(s_i, a, s_j)
            total_time ← total_time + t(s_i, a, s_j)
    ρ ← [total_reward/total_time]
```

In the example pseudo-code above, TUNE-LEARNING may represent a machine tuning algorithm, as described in more detail herein. In this example, INIT-FACTORS may represent a method usable to initialize parameters used in dynamic machine learning, while LOCATE-ACTION may represent a randomized algorithm used to locate an action with the maximum State-Action value mapping. In this example, SIMULATE-ACTION may represent a method for simulating an action, and UPDATE-ACTION may represent a method for updating the State-Action value mapping. LOCATE-POLICY may represent a method a locating a policy with optimal State-Action value mapping.

As previously noted, the fundamental property of the value function may be employed in machine tuning. This may be used to produce an accurate estimation represented in a tabular format with a set of tuples, which comprise states or state-action pairs.

$$Q(s, a) = Q(s_t, a_t) + a_t \delta_t$$

$$\delta_t = r(s_t, \pi(s_t), s_{t+k}) - \rho_t + \max_a (Q(s_{t+1}, a) - Q(s_t, a_t))$$

$$\rho_{t+1} = \rho_t + \beta_t (\gamma(s_t, a_t, s_{t+1}) - \rho_t)$$

In the equations above, $\rho_t$ and $\beta_t$ are positive step parameters set to 1/t and the discount rate is $\gamma \in [0, 1)$. The above iterative learning approach may converge to the optimal state-action value with discount. However, there may be no convergence proof for this approach in cases of average reward. In addition, the above equations may not be well suited for large or continuous action and state spaces.

Let $\tilde{Q}(s, a, p)$ approximate to $Q^*(s, a)$ based on a linear combination of basis functions with a parameter vector p:

$$\tilde{Q}(s, a, p) = \sum_{1 \le i < M} X p^i \varphi^i(s, a)$$

In this example, a column vector with a fixed number of real valued components, $p = (p^1, p^2, \ldots, p^M)^T$ and $$\phi(s,a) = (\phi^1(s,a), \phi^2(s,a), \ldots, \phi^M(s,a))^T$$

Hence, $\tilde{Q}(s, a, p)$ may represent a smooth differentiable function of p for all $s \in S$. The above Bellman equation error may be estimated by the mean-squared-error over a distribution P of inputs, as shown below.

$$MSE(\vec{p_t}) = \sum_{s \in S} P(s)[Q^*(s, a) - \tilde{Q}(s, a, p)]^2$$

$$MSE(\vec{p_t}) = \sum_{p=1}^{n} (y_p - o_p)^2$$

Hence, unless validation is performed, there may be no guarantee of the network's performance. A common approach may be to split data into two subsets in order to generate neurons and predict the function rewards.

$$p_{t+1} = p_t + \alpha [Q^*(s,a) - \tilde{Q}(s,a,p)] \vec{\nabla} \vec{p_t} \tilde{Q}(s_t, a_t, p_t)$$

In this equation, α is a positive step-size parameter, and $\vec{\nabla}\vec{p_t} Q(p)$, for any function Q denotes the vector of partial derivatives.

$$\nabla \vec{p_t} Q(p) = \left( \frac{\partial Q(\vec{p_t})}{\partial p_t(1)}, \frac{\partial Q(\vec{p_t})}{\partial p_t(2)}, \ldots, \frac{\partial Q(\vec{p_t})}{\partial p_t(t)} \right)^T$$

In this equation, $\phi(s_t, a_t)$ is a vector of all basis functions. Since $$\vec{\nabla}\vec{p_t}\tilde{Q}(s_t, a_t, p_t) = \phi^i(s,a)$$

the above equation may be updated as:

$$p_{t+1} = p_t + \alpha [Q^*(s,a) - \tilde{Q}(s,a,p)] \phi^i(s,a)$$

Hence, the average reward estimate may be updated as follows:

$$p_{t+1} = (1-\alpha)\rho t + \alpha_t (r(s_t, a_t, s_{t+1}) - \rho_t)$$

As noted earlier, this choice may result in the sample average method, which may be guaranteed to converge to the true action value by the law of large numbers. A well-known result in stochastic approximation theory yields the conditions about the learning rate $$\left( \sum_{1 \le k < \infty} \alpha_t = \infty \text{ and } \sum_{1 \le k < \infty} \alpha_t^2 < \infty \right),$$

which may be required to assure convergence with probability 1.

As discussed earlier, real world systems and real time measurement may have large state and action spaces resulting in latency and errors to reach a convergent state. Hence, autonomous search may depend on the nature of the parameterized function approximation to generalize from a limited subset of current state space over a much larger subset of state and action space. In some embodiments, index data structure mapping techniques may be used to lookup a state-action value function, to generalize from them, to construct a numeric value approximation of the entire search function.

The attack class discovery problem described herein may be to group data samples in specific individual class categories that not only represent current data clusters, but may also be used in predicting previously unknown attack classes.

In some embodiments, Q learning may be used to optimize the clustering methods, e.g., by computing and comparing various cluster methods. First of all, to reduce the dimensionality of learning, only selected training and test data sets may be used for class discovery. As described below, in one evaluation, several clustering methods were evaluated for class discovery with 100% accuracy.

The k-means algorithm is an algorithm to cluster objects based on attributes into k partitions. It attempts to find the centers of natural clusters in the data. With the k-means algorithm, attributes may hold a vector space. The result of one evaluation described herein showed that k-means algorithms may discover attack classes with 100% accuracy, using both training and test datasets. In this evaluation, the cluster sum of squared errors was 0.563.

An RL iterative algorithm runs an arbitrary cluster on data that has been passed through an arbitrary filter. Like the cluster, the structure of the filter may be based exclusively on the training data and test instances that are processed by the filter without changing their structure. A filtered cluster algorithm was found to report discovery of the attack classes with 100% accuracy with both training and test datasets. In this evaluation, the cluster sum of squared errors is 0.563.

Clustering data uses a farthest-first algorithm to develop a best possible heuristic to resolve k-center problem. In this evaluation, the farthest-first algorithm was found to report discovery of attack classes with 100% accuracy with both training and test datasets.

Hence, the evaluation resulted in a proposal to use k-means algorithm, filtered cluster algorithm and/or a farthest-first algorithm for attack discovery prediction, since these algorithms demonstrated both accuracy and performance of prediction for the selected training and test datasets.

A large published data repository hosting intrusion dataset was selected to evaluate the proposed approaches for several reasons: (1) it is a subset of standard dataset and is a revision of the 1998 DARPA intrusion detection evaluation dataset originated from MIT Lincon Labs; (2) it is a dataset proved by researchers and has been used for the third international knowledge discovery and data mining tools competition and the fifth international conference on knowledge discovery and data mining; (3) it is an intrusion prediction specific dataset the motivation for which was to build a network intrusion predictive model for detect intrusions or attacks; (3) it includes broad intrusions simulated in a military network environment; and (4) this dataset has been preprocessed.

In this dataset, features characterizing network traffic behavior have been extracted to compose each record. The values in each data record are in two categories. One is a symbolic value and another comprises real numbers. The data size in this evaluation was 75 MB. The dataset contained 22 attack types that can be classified in four main intrusion classes as shown in Table 1, below.

TABLE 1

KDDCup99 Attack Classes

| Attack Class | Attack Category | Attack Samples |
| --- | --- | --- |
| normal | normal | 95278 |
| u2r | buffer_overflow, loadmodule, multihop, perl, rootkit | 59 |
| r2l | ftp_write, guess_passwd, imap, phf, spy, warezclient, warezmaster | 1119 |
| dos | back, land, neptune, pod, smurf, teardrop | 391458 |
| prb | ipsweep, nmap, portsweep, satan | 4107 |

There are two prevention datasets published with KDDCup99 samples. The first dataset includes distinguished distinctions, which may be used for classification training. The second dataset, for which appearances are similar, may be used to evaluate the correctness of the proposed class predictors. These same two datasets were used in the evaluation described herein.

Specifically, the first training dataset is composed of 75 MB samples. Within the training dataset, samples are labeled as being in one of 4 classes of attacks. The class distinction may be used for training of class prediction and clustering techniques. The second independent test dataset includes 45 MB samples. The test dataset includes the same classes of samples as those in the training dataset. The class categories in the test dataset may be used to compute the learning performance of ROC values. For finer optimization, attack types may be used for class labels in the tests.

Using the above data samples, a data feeder was designed and developed to transform the published datasets into the Attribute-Relation File Format (arff) for training and prediction. Each parameter in the dataset was formulated as a data feature, and a value was the corresponding percept of the variable. Hence, there were 42 attributes existing in the resulting training.arff and test.arff relations. These were used for training and testing purposes, respectively. In the evaluation described herein, the two arff files may be used for attribute selection in order to identify the sub-space of feature extraction for further classification learning. The specific attribute selection may be applied to classifier level so that compatible results may be achieved. The results show that there were only ten attributes selected for the classification test. The selected attributes, in this example, were protocol_type, service, src_bytes, dst_bytes, wrong_fragment, count, diff_srv rate, dst_host_srv_count, dst_host_same_src_port_rate, and dst_host_rerror_rate.

In the example evaluation, to conduct sample reduction, multiple attribute space search and evaluation methods are considered for attribute selection. The evaluation may search the space of attribute subsets by greedy hill-climbing augmented with a backtracking facility. In different embodiments, the method may first start with the empty set of attributes and search forward, may start with the full set of attributes and search backward, or may start at any point and search in both directions. In addition, a correlation-based feature subset selection may be used to generate the sub-space of selected training and test datasets. Some such embodiments may evaluate the worth of a subset of attributes by the individual predictive ability of each feature along with the degree of redundancy between them. In such embodiments, subsets of attributes that are highly correlated with the classes, while having low inter-correlation, are preferred.

In the example evaluation, instance selection was a suitable fit for the sample reduction. Instance-based sample reduction may produce a random subset of a dataset using sampling with replacement or without replacement, in different embodiments. Since the original dataset fits in memory, the number of instances in the generated dataset may be specified as 1%, in this example. The filter may be made to maintain the class distribution in the sub-sample or to bias the class distribution toward a uniform distribution. After instance sampling, randomized 1% training and test datasets may be created for further classification prediction and clustering prediction.

In addition to format conversion, there may be several modifications to the dataset in this evaluation:
All string type attributes may be defined as nominal data types.
Both relation and attribute definition may be inserted into datasets.

The attack type and attack class labels may be included in the arff files to calculate learning performance as different test cases.

After attribute and instance selection is completed, the above arff files may be filtered with only selected attributes or instances in arff format. Hence, the final classification computation may import only these selected arff files.

In this example, the selected datasets may only have 42 attack attribute name and value pairs for 4940 samples in the training dataset and 3110 samples in the test dataset. This may result in a significant cost reduction for learning of class prediction and clustering.

The detailed value of the sample instance is presented in Table 2 below. As shown in Table 2, encoding may be done for each symbolic data type in Table 1 in order to apply them to initialize an arbitrary network for tuning. For example, protocol_type, service, flag, land, logged_in, is_host_login, is_guest_login, and back may be required to be encoded with the sample instance, which may be utilized for classification network tuning.

Although RL based interactive optimization may be used for network tuning, the initial arbitrary learning network may be established with heuristics of the problem specification. In this example, with 42 extracted features of network communications, 42 input nodes may be selected to initialize the input layer. A hidden layer may be initialized with 3 nodes, whereas output nodes may be initialized as 5 nodes for each class of the listed attack types.

Tuning may be done using RL interactive algorithms for optimizing the initial network architecture. The network may be monitored and modified during training time. In this example, the nodes in the network may all be sigmoid. The properties that may be tuned include:

Type of machine learning network
Learning Rate for the back-propagation algorithm
Momentum Rate for the back-propagation algorithm
Number of epochs to train through
The consequential number of errors allowed for validation testing before the network terminates.
Number of nodes on each layer in a multiple layer network In literature, predictive models may be parametric, non-parametric, or semi-parametric. The example evaluation described herein may be used to study parametric machine learning methods. The experiments described were designed to utilize the datasets published with KDDCup99 datasets. The experiments are designed with consistent evaluation techniques. First, training of prediction models using the selected dataset may be evaluated by tenfold cross-validation. Then, the trained models may be validated using the selected test datasets. The Q learning based classification results are described below. Note that Q learning is based on correct classification due to large sample classification. ROC values are listed in the detailed test result tables (Table 1 and Table 2).

In this example, after each move of machine learning method at the top level of selection, the learning agent may receive a discrete environment signal from the task environment comprising one of the following reinforcement immediate reward signals r∈R:

r=−10 if agent makes a less correct classification
r=0.1 if agent makes a more correct classification
r=0.4 if all samples are classified correctly
r=−1 the cost of making any selection
r=0.0 otherwise for all non-terminal states As in the previous discussion, the move to the correct classification may be less than the absolute value of moving to wrong classification ratios, since keeping the agent on grid may be more important than getting to the target. Conceptually, the agent needs to learn to achieve goal without rewards. The agent may be required to move toward the correct classification. However, the sooner the action is rewarded, the sooner the agent may learn. The cost of moving may be measured by a negative unit reward from the task environment. It may be larger than the reward from getting to the correct positions. This way, the steps in the path may be considered in the search evaluation. The results of the evaluation of various learning algorithms and related class prediction results using training and test datasets are shown in Table 2 below for comparison:

TABLE 2

Classification Prediction Result for Q Learning

| ID | Classifier Category | Algorithm | Results (Training/Test) |
|---|---|---|---|
| (1, 1) | Tree | J48 | 99.0891%/91.0932% |
| (1, 2) | Tree | LMT* | 99.7368%/91.2862% |
| (1, 3) | Rule | PART* | 99.5951%/91.254% |
| (1, 4) | Function | LibSVM | 97.4291%/77.6527% |
| (1, 5) | Function | MultilayerPerceptron* | 99.413%/90.5145% |
| (1, 6) | Function | RBFNetwork | 99.3725%/80.7074% |
| (1, 7) | Meta | SelectAttributeClassifier* | 99.3725%/91.4791% |
| (1, 8) | Bayes | BayesNet* | 99.0891%/91.0932% |
| (1, 9) | Bayes | NaiveBayes* | 95.6883%/77.8135% |

In this example, a significant finding from the network Q learning result is that SelectAttributeClassifier, Bayes Network, LMT, PART and Neuro Perceptron Network methods were found to have the highest values and accuracy. This may indicate that these algorithms are better suited for attack class prediction than other methods. Note that tenfold cross-validation on the full training set may be selected for all algorithm training, in some embodiments. In embodiments that use the full training set without cross-validation, the results may seem overlay optimistic, with full ROC value and 100% correct classification during the training cycle. However, test validation may show the error ratio of classification, as in Table 2. As shown in this example, cross-validation may be a suitable technique for comparing the training performance of various attack detection and classification techniques.

In one autonomous tuning example, an action of MultilayerPerceptron (MP) with a probability of 1/9 is selected. The state is marked as $s_1$ with r=−0.9 due to high correct classification results with additional moving costs. This action value mapping may increase the number of visited state-action pairs by V (1)=V (1)+1. This state transition may also increase the number of interactions by 1. Hence, the α=0.1/V=0.1. Therefore, the Q factor may be updated as follows. Since all $Q(s_1, A(s_1))$ pairs are initialized as −10, the following equation (shown also above):

$$Q(s,a) = Q(s_t, a_t) + \alpha_t \delta_t$$

may be evaluated as:

$$Q(s_1, MP) = (1-0.1)*Q(s_1, MP) + 0.1*[(-0.9) + \max Q(s_1, A) + 10] = -9.009$$

Since the current iteration is less than the maximum iteration, action BayesNet may be selected as the learning network with current state $s_1$. The state may be updated to $s_2$ with reward of +0.2 and a moving cost of −1 due to the expected action to move. Hence, r=−0.8 is the total reward of this computation.

$$Q(s_2, BayesNet) = (1-0.1)*Q(s_1, BayesNet) + 0.1*[(-0.8) + \max Q(s_2, A) + 10] = -9.008$$

Hence, the state $s_1$ with action BayesNet may be selected as a significant state as $Q(s^*; a^*)=-9.008$ for further Q factor computation.

In this example, the current state may be set to $s_2$ to select an action of SelectAttributeClassifier with a probability of 1/9. The state may be changed to $s_3$ with r=-0.7 due to the action to be taken by the agent. This action value mapping may increase the number of visited state-action pairs by V (3)=V (3)+1. This state transition may also increase the number of interactions by 1. Hence, the $\alpha=0.1/V=0.1$. Therefore, the Q factor may be updated as:

$Q(s_3,\text{BayesNet})=(1-0.1)*Q(s_1,\text{BayesNet})+0.1*[(-0.7+\max Q(s_3,A)+9.008]=-9.0702$ In this example, the current state may be set to $s_3$ to select an action of LMT with a probability of 1/9. The state may be changed to $s_4$ with r=-0.6 due to the action to be taken by the agent. This action value mapping may increase the number of visited state-action pairs by V (4)=V (4)+1. This state transition may also increase the number of interactions by 1. Hence, the $\alpha=0.1/V=0.1$. Therefore, the Q factor may be updated as:

$Q(s_4,LMT)=(1-0.1)*Q(s_1,LMT)+0.1*[(-0.6)+\max Q(s_4,A)+9.008]=-9.0602$

Consequently, the state $s_1$ with action listed in Table 1 may be simulated with 1/9 probability distribution. In this example, the simulation may conclude that LMT is the optimal prevention method for the current learning samples.

In this example, with exploration activities, MP may have equal probability for further tuning of the network architecture. In this example, the current state may be set to $s_4$ to select an action of MP with a probability of 1/9. The state may be changed to $s_5$ with r=-0.9 due to the action to be taken by the agent. This action value mapping may increase the number of visited state-action pairs by V(5)=V(5)+1. This state transition may also increase the number of interactions by 1. Hence, the $\alpha=0.1/V=0.1$. Therefore, the Q factor may be updated as:

$Q(s_5,MP)=(1-0.1)*Q(s_5,MP)+0.1*[(-0.9)+\max Q(s_5,A)+9.008]=-9.092$

The subsequent tuning of MP prediction architecture, in this example, is illustrated in Table 3, below.

TABLE 3

MP Prediction Result for Q Learning

| ID | Architecture | Results (Training/Test) |
|---|---|---|
| (2, 1) | 42, 1, 4 | 98.502%/90.0322% |
| (2, 2) | 42, 3, 4* | 98.7854%/90% |
| (2, 3) | 42, 5, 4* | 99.1093%/90.9003% |
| (2, 4) | 42, 5, 10* | 98.502%/90% |
| (2, 5) | 42, 10, 4* | 98.7652%/90% |

To avoid greedy local optimum, iterations may continue until the maximum interaction number is reached, then the current state may be set back to $s_1$ to continue to select an action. In this example, MP may have an equal probability for further tuning of network architecture (42, 1, 4). The current state may be set to $s_4$ to select an action of MP with a probability of 1/9. The state may be changed to $s_5$ with r=-0.9 due to the action to be taken by the agent. This action value mapping may increase the number of visited state-action pairs by V(5)=V(5)+1. This state transition may also increase the number of interactions by 1. Hence, the $\alpha=0.1/V=0.1$. Therefore, the Q factor may be updated as:

$Q(s_5,MP)=(1-0.1)*Q(s_5,MP)+0.1*[(-0.9)+\max Q(s_5,A)+9.008]=-9.092$

In this example, the current state may be set to $s_5$ to select an action of MP with a probability of 1/9, to continue to tune the network as (42, 3, 4). The state may remain as $s_5$ with r=-1 due to the action to be taken by the agent. This action value mapping may increase the number of visited state-action pairs by V(5)=V(5)+1. This state transition may also increase the number of interactions by 1. Hence, the $\alpha=0.1/V=0.05$. Therefore, the Q factor may be updated as:

$Q(s_5,MP)=(1-0.1)*Q(s_5,MP)+0.1*[(-0.9)+\max Q(s_5,A)+9.008]=-9.092$

Now, the current state may be set to $s_5$ to select an action of MP with a probability of 1/9 to continue to tune network as (42, 5, 4). The state may remain as $s_5$ with r=-0.9 due to the action to be taken by the agent. This action value mapping may increase the number of visited state-action pairs by V(5)=V(5)+1. This state transition may also increase the number of interactions by 1. Hence, the $\alpha=0.1/V=0.033$. Therefore, the Q factor may be updated as:

$Q(s_5,MP)=(1-0.05)*Q(s_5,MP)+0.05*[(1)+\max Q(s_5,A)+9.008]=-8.5832$

Hence, in this example, Q(s5, 42-5-4) may be shown to be the optimal state action. In other words, this evaluation may conclude that a multi-layer perceptron network with 42 input nodes, 5 hidden nodes and 4 output nodes may be an optimal prevention method.

Figure 9:
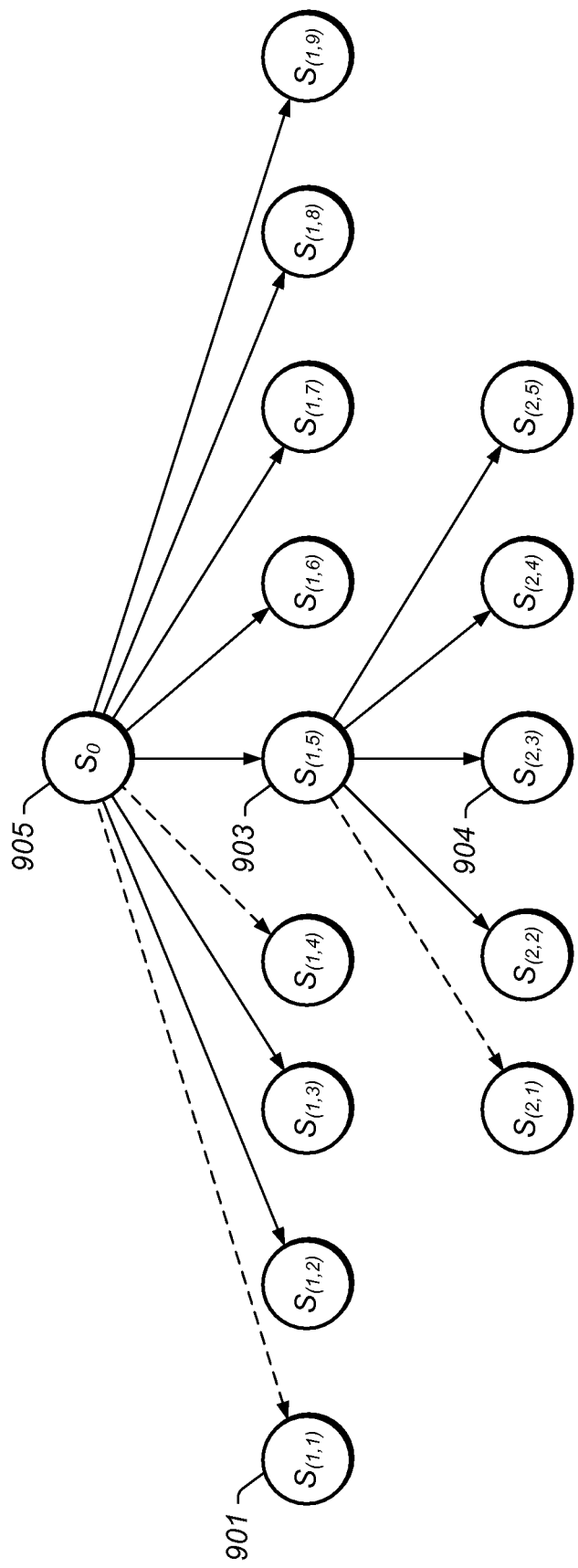
FIG. 9 is a diagram illustrating the results of a machine learning tuning operation, according to one embodiment.

The experimental evaluation of this autonomous tuning example is illustrated in FIG. 9. This figure illustrates a simplified version of classification goal discovery without numerous non-optimal path explorations. In this example, algorithms determined to be suitable for use are shown using solid lines from element 905 (state $S_0$), and are identified as $S_{(1,2)}$, $S_{(1,3)}$, $S_{(1,5)}$, $S_{(1,6)}$, $S_{(1,7)}$, $S_{(1,8)}$, and $S_{(1,9)}$. In this example, element 903 (representing the Multilayer Perceptron (MP) algorithm, identified as $S_{(1,5)}$ in Table 2 above) was selected from among the suitable options. Note that in this example, element 901 (representing a J48 algorithm, identified as $S_{(1,1)}$ in Table 2 above) was determined to be less suitable, as indicated by the dashed line from element 905 to element 901. In this example, the results of the tuning of the MP algorithm are illustrated in FIG. 9 by the solid line from element 903 to element 904 (representing an architecture of 42 input nodes, 5 hidden nodes, and 4 output nodes, and identified in Table 3 as $S_{(2,3)}$). Other suitable options include states $S_{(2,2)}$ (representing 42 input nodes, 1 hidden node, and 4 output nodes), $S_{(2,4)}$ (representing 42 input nodes, 5 hidden nodes, and 10 output nodes), and $S_{(2,5)}$ (representing 42 input nodes, 10 hidden nodes, and 4 output nodes), as indicated by the solid lines from $S_{(1,5)}$ in FIG. 9 and various entries in Table 3.

The attack prevention problem resolved using the system and methods described herein may be thought of as the combinational problem of attack classification and attack clustering. In some embodiments, to handle learning with large samples, sample reduction with attribute and instance selection may reduce both time and space complexities.

From the class prediction results described herein, SVMs, SMO and Vote may be tuned off by the proposed autonomous classification algorithms for attack class prediction. On the other hand, SelectAttributeClassifier, BayesNet, LMT, PART and Neuro Perceptron Network may be exploited algorithms for autonomous attack class prediction. Specifically, autonomous Bayes Networks and Neural Networks may be exploited optimal prevention networks in terms of time and space complexity, in some embodiments. Using the attack clustering results from evaluations described herein, a k-means algorithm, filtered cluster algorithm and farthest-first algorithm may be recommended attack discovery methods for attack discovery.

Figure 10:
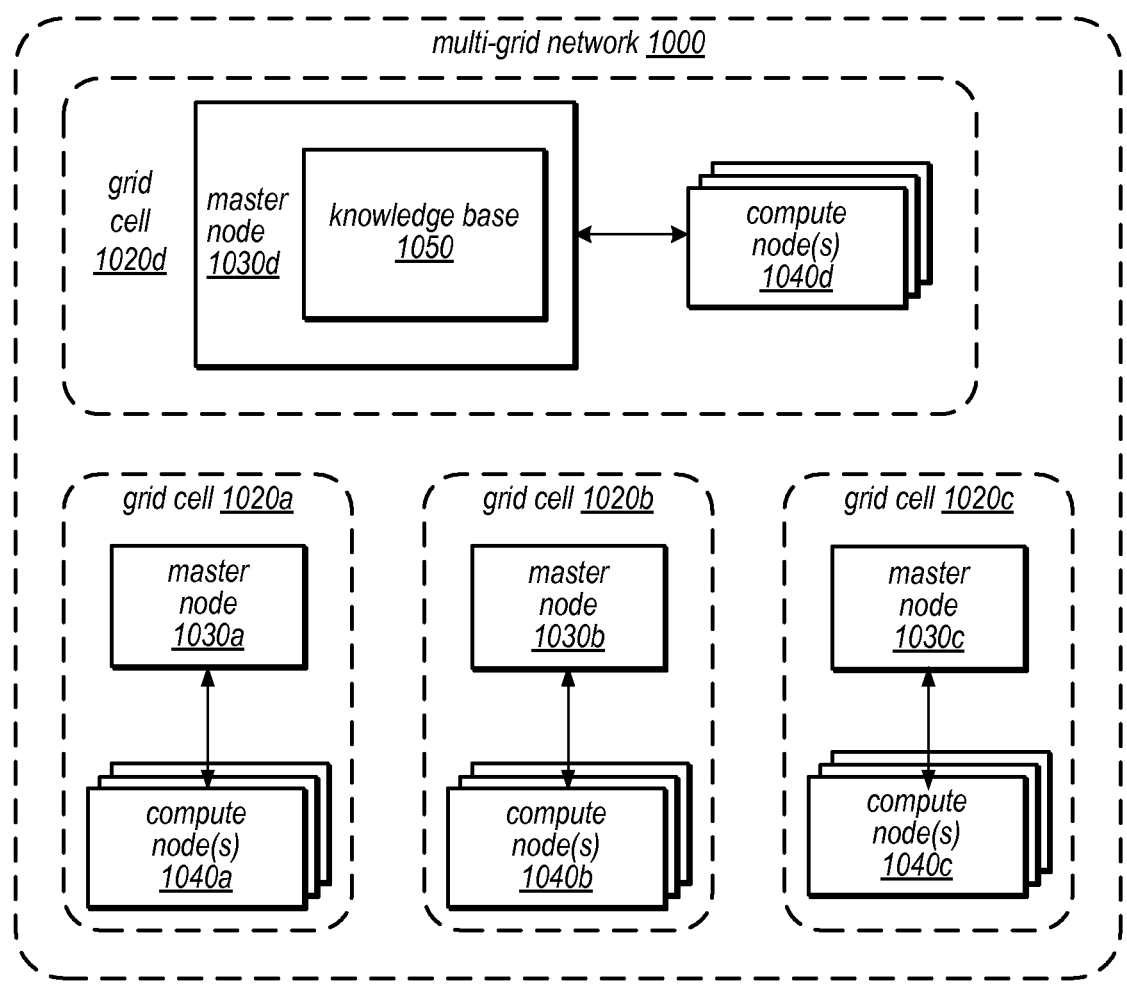
FIG. 10 is a block diagram illustrating a multi-grid network, according to one embodiment.

The system and methods described herein may be suitable for application to any of various computing systems, including grid computing systems, mobile ad-hoc networks, and other distributed computing environments, in different embodiments. For example, FIG. 10 illustrates a multi-grid network 1000 configured to implement the attack discovery and prevention methods described herein. In this example, multi-grid network 1000 includes four grid cells 1020, each of which includes a master node 1030, and a plurality of compute nodes 1040, although in other embodiments a grid computing system may include any number of grid cells, master nodes, and/or compute nodes configured similarly or differently. Master nodes 1030 may in some embodiments be similar to master nodes 240 illustrated in FIG. 2, and each may include an information layer agent, such as information layer agents 245 of FIG. 2. Similarly, compute nodes 1040 may in some embodiments be similar to compute nodes 260 illustrated in FIG. 2, and each may include a data collection agent 275. In this example, master node 1030d of grid cell 1020d comprises a knowledge base 1050, which may be accessible by all of the master nodes 1030 in multi-grid network 1000.

In some embodiments, each of a plurality of subnets within a multi-grid network, or within another distributed environment, may represent a different attack domain, and these attack domains may include different policies, knowledge bases, and/or rules for carrying out the methods described herein. In one such embodiment, a knowledge base may be partitioned and/or distributed across two or more nodes (e.g., master nodes 1030) such that policies and/or rules related to storage area network attacks (e.g., device-level, storage network, or physical layer rules) are included in one partition, while policies and/or rules (e.g., compute resource, application-level, or IP network rules) related to internet applications or other web-based attacks (such as those of a cloud computing environment or other computing services environment) are included in one or more other partitions, for example. Agents of each subnet, domain, or partition may monitor different parameters or conditions, and may include a different mapping of state-action value pairs appropriate for the type of attack classification directed to that subnet, domain, or partition. In other words, particular actions may be mapped to the same conditions or to different conditions on different subnets, domains, or partitions. For example, in a system that includes storage devices that are not IP network available, a storage area network attack may not be probed using the IP network, but only on the local network or partition. In some embodiments of partitioned systems, one or more central nodes may consolidate or aggregate information generated by information agents in multiple sub-domains in order to coordinate responses and/or actions to be taken on current and/or potential victim nodes, and/or to manage updates to one or more knowledge bases in the distributed system. For example, an information agent on a central node may classify an attack based on a combination of notifications received from both a storage-focused information layer agent (e.g., one targeted to a first partition) and a compute-resource-focused information layer agents (e.g., targeted to a second partition).

Figure 11:
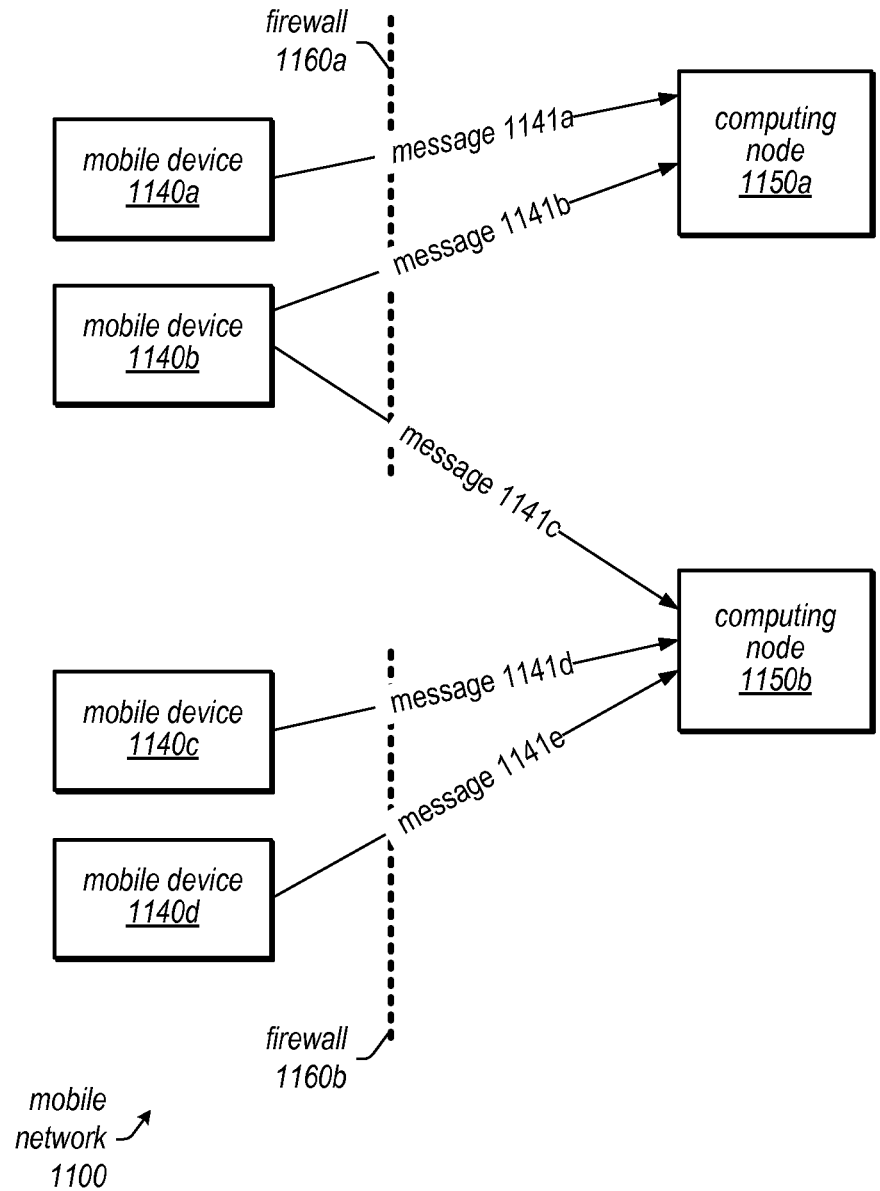
FIG. 11 illustrates the passing of messages between mobile devices and other nodes in a distributed computing environment, according to one embodiment.

As previously noted, the system and methods described herein may be suitable for implementation in a mobile ad-hoc network due to their autonomous nature, and the flexibility and adaptability of their attack tree discovery and flood control processes. FIG. 11 illustrates one such mobile ad-hoc network 1100 that includes multiple mobile devices 1140 behind two different firewalls 1160. In this example, a very small (i.e., lightweight) data collection agent, which may be different from or similar to one of data collection agents 275 illustrated in FIG. 2, may be deployed on each of the mobile devices 1140 (not shown). For example, mobile devices 1140 may include laptop computers, cell phones, personal digital assistants, devices employing SunSPOT™ technology, or other mobile devices and program instructions on each of these devices may be executable to implement a mobile attack discovery agent (MADA), as described above. In some embodiments, data collection agents on mobile devices 1140 may communicate to information layer agents on one or more of computing nodes 1150 across firewalls 1160 by sending event driven messages 1141, according to a mobile attack discovery protocol (MADP), such as that described above.

Figure 12:
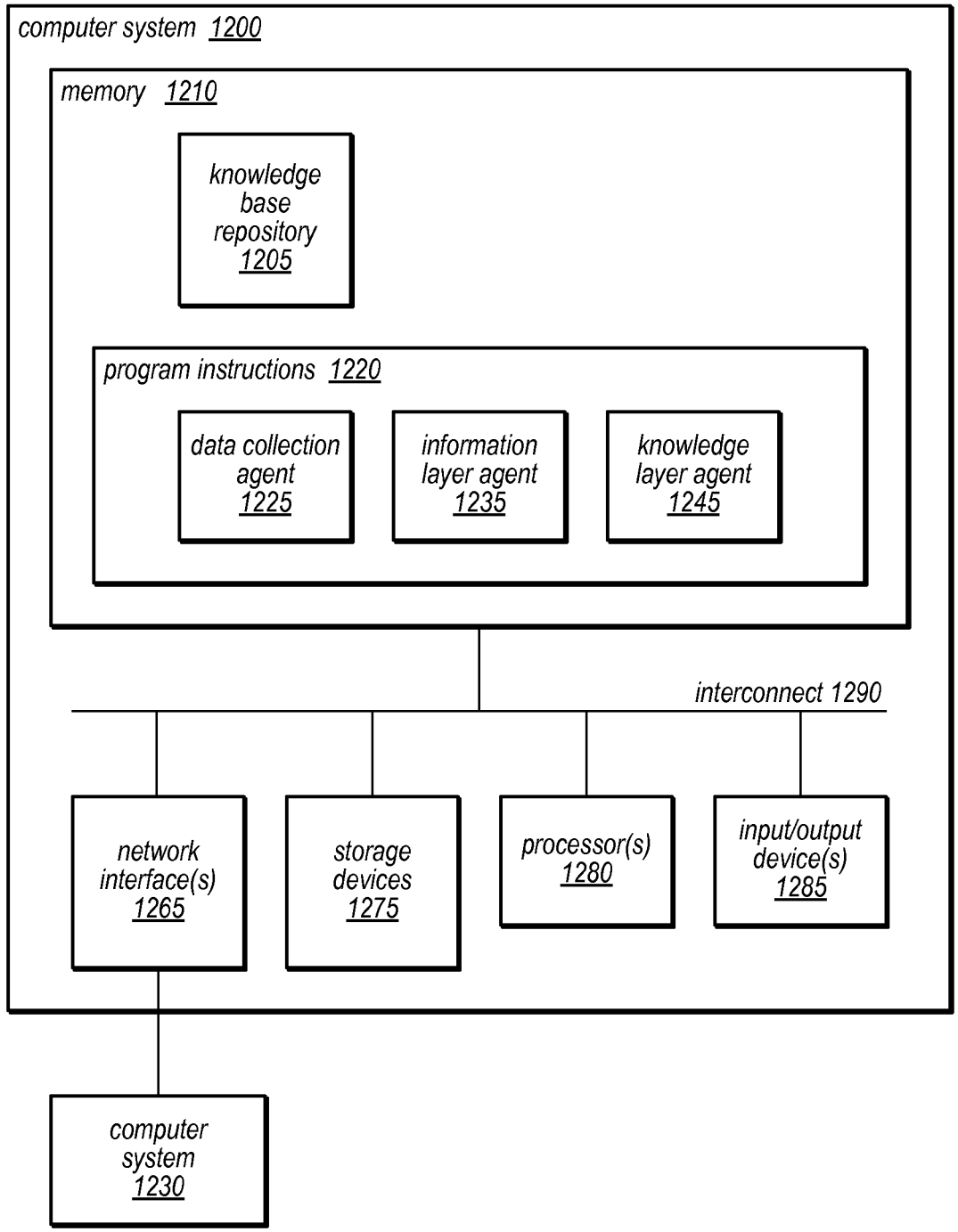
FIG. 12 is a block diagram illustrating an exemplary computer system configured to implement attack discovery and/or prevention, according to one embodiment.

The system and methods described herein may be provided on any of various computing systems (e.g., systems included in a distributed environment, such as those described above) configured to implement the functionality described. FIG. 12 illustrates a computing system 1200 configured to implement the methods described herein, according to various embodiments. In one embodiment, a distributed computing environment may be implemented on one or more nodes that include components similar to those of computer system 1200 (e.g., memory 1210, network interfaces 1265, storage devices 1275, processors 1280 and input/output devices 1285) and that are configured to communicate with each other through network interface 1265. For example, computer system 1230 may include components similar to those of computer system 1200 and may be configured to communicate with computer system 1200 as part of a grid computing environment, peer-to-peer environment, or mobile network, in different embodiments. In other embodiments, computer systems 1200 and/or 1230 may comprise more, fewer, or different components than those illustrated in FIG. 12.

Computer system 1200 may be any of various types of devices, including, but not limited to, a personal computer system, desktop computer, laptop or notebook computer, mainframe computer system, handheld computer or other mobile device (e.g., a personal digital assistant, application-enabled phone, or mobile communication device), workstation, network computer, a consumer device, application server, storage device, a peripheral device such as a switch, modem, router, etc, or in general any type of computing device. As described above, a distributed computing environment may be distributed across two or more nodes, and each node may comprise a computer system identical or similar to that illustrated in FIG. 12.

The methods described herein may in some embodiments be provided as a computer program product, or software, that may include a computer-readable storage medium having stored thereon program instructions, which may be used to program a computer system such as computer system 1200 (or another electronic device) to perform a process according to the methods described herein. A computer-readable storage medium may include any mechanism for storing information in a form (e.g., software, processing application) readable by a machine (e.g., a computer) and executable by the machine to implement the methods described herein. A machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of media suitable for storing program instructions. In addition, program instructions may be communicated to computer system 1200 using optical, acoustical or other form of propagated signal (e.g., carrier waves, infrared signals, digital signals, etc.) in order to program the computer system to perform the processes described herein. In other embodiments, all or a portion of the methods described herein may be implemented by hardware components of computer system 1200 (e.g., by one or more FPGAs, or by other dedicated circuitry configured to perform these processes).

A computer system 1200 may include a processor unit 1280 (possibly including multiple processors, a single-threaded processor, a multi-threaded processor, a multi-core processor, etc.). The computer system 1200 may also include one or more system memories 1210 (e.g., one or more of cache, SRAM, DRAM, RDRAM, EDO RAM, DDR RAM, SDRAM, Rambus RAM, EEPROM, etc.), a system interconnect 1290 (e.g., LDT, PCI, ISA, etc.), one or more network interface(s) 1265 (e.g., an ATM interface, an Ethernet interface, a Frame Relay interface, etc.), and one or more storage device(s) 1275 (e.g., optical storage, magnetic storage, etc.). Memory 1210 and/or storage devices 1275 may include a computer-readable storage medium, as described above, and may include other types of memory as well, or combinations thereof. Note that in some embodiments, network interface(s) 1290 may include hardware and/or software support for implementing internal and/or external interconnect resources (e.g., NAT, load balancing, VPN, WebDAV, etc.). In the example illustrated in FIG. 12, computer system 1200 may include one or more input/output devices 1285, such as a monitor or other display device through which users may interact with computer system 1200 (e.g., through a GUI). Other embodiments may include fewer components or additional components not illustrated in FIG. 12 (e.g., video cards, audio cards, additional network interfaces, peripheral devices, etc.). The processor unit(s) 1280, the storage device(s) 1275, the network interface 1265, the input/output devices 1285, and the system memory 1210 may be coupled to the system interconnect 1290, as shown in this example.

One or more of the system memories 1210 may embody one or more knowledge base repositories 1205, as described herein. Note that in some embodiments, a knowledge base repository 1205 may be included in one or more of storage devices 1275, instead of, or in addition to, being included in system memory 1210. Note that various elements illustrated in FIG. 12 as residing in memory 1210 may in some embodiments be implemented in different memory spaces (e.g., a shared memory space and one or more local memory spaces) within a single physical memory or as different memory spaces distributed across any number of physical memories devices (e.g., in one or more storage devices 1275 and/or storage devices of a computing system other than computer system 1200), in different embodiments.

In some embodiments, memory 1210 may include program instructions 1220 computer-executable to implement all or a portion of the methods described herein. For example, program instructions 1220 may be executable to implement a data collection agent 1225, an information layer agent 1235, and a knowledge layer agent 1245. A knowledge layer agent may in some embodiments provide functionality to query and/or modify the contents of knowledge base repository 1205. For example, knowledge layer agent 1245 may be configured to receive messages from information layer agent 1235 comprising a repository query and/or a new or modified entry to be stored in knowledge base 1205. Note that data collection agent 1225, information layer agent 1235, and knowledge layer agent 1245 may each be implemented in any of various programming languages or methods. For example, in one embodiment, data collection agent 1225 may be Java™ based, while in other embodiments, they may be written using the C or C++ programming languages. Similarly, information layer agent 1235 and knowledge layer agent 1245 may be implemented in Java™, C, or C++, among other programming languages, according to various embodiments. Moreover, in some embodiments, data collection agent 1225, information layer agent 1235, and knowledge layer agent 1245 may not be implemented using the same programming language. For example, data collection agent 1225 may be C++ based, while other components may be developed using C or Java™. While the example illustrated in FIG. 12 depicts a computer system 1200 in which a data collection agent 1225, an information layer agent 1235, a knowledge layer agent 1245, and a knowledge base repository 1205 are resident on the same node, in other embodiments instances of these elements may be resident on two or more nodes in a distributed environment, such as those described herein. Note that program instructions 1220 may in some embodiments include instructions configured to implement other functionality not shown, such as a compiler, debugger, operating system, or other standard and/or custom software components of a computing system.

While systems and methods for attack discovery and prevention have been described herein with reference to various embodiments, it will be understood that these embodiments are illustrative and that the scope is not limited to them. Although the embodiments above have been described in detail, numerous variations and modifications will become apparent once the above disclosure is fully appreciated. Many variations, modifications, additions, and improvements are possible. More generally, the system and methods are described in the context of particular embodiments. For example, the blocks and logic units identified in the description are for understanding the described invention and not meant to be limiting. Functionality may be separated or combined in blocks differently in various realizations or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow. It is intended that the following claims be interpreted to embrace all such variations and modifications.

What is claimed is:

1. A method, comprising:

performing, by one or more computers:

receiving a message comprising information indicative of an event detected on one of a plurality of nodes in a distributed computing system, wherein the information comprises an indication of a resource-related, performance-related, or workload-related run-time behavior of the one of the plurality of nodes;

accessing a knowledge base comprising information about run-time behaviors associated with known computing system attack patterns, wherein said run-time behaviors are indicative of known attack patterns that lead to removal or degradation of one or more nodes of a computing system by external requests to said one or more nodes;

classifying the event detected on the one node as being representative of one of the known computing system attack patterns or as being representative of an unknown attack pattern, dependent, at least in part, on the knowledge base and on the information in the received message, wherein said classifying indicates a current or near-term attack on the one node by external requests to the one node; and initiating a response to the event, dependent on said classifying.

2. The method of claim 1, further comprising:
updating the knowledge base using reinforcement learning, dependent on said response.

3. The method of claim 2,
wherein said classifying comprises applying an attack detection and classification technique; and
wherein said updating comprises tuning the attack detection and classification technique using reinforcement learning.

4. The method of claim 3, wherein said tuning comprises one or more of: modifying a number of input nodes, output nodes or hidden nodes of a model of the distributed computing system; selecting a different attack detection and classification technique; adding, removing or modifying a state-action value pair used by the attack detection and classification technique; or modifying a number of layers of an overlay network over which messages are sent during said applying.

5. The method of claim 1, further comprising:
dynamically modifying an attack tree model of the distributed computing system, dependent on a change in configuration of the distributed computing system, a change in a pattern of received event messages, or a change in workload in the distributed computing system.

6. The method of claim 1, further comprising:
dynamically modifying an overlay network of the distributed computing system over which event detection messages or attack response messages are sent dependent on a change in configuration of the distributed computing system, a change in a pattern of received event messages, or a change in a workload in the distributed computing system.

7. The method of claim 1, further comprising:
determining a probability that the event signifies an attack on the distributed computing system;
wherein said determining comprises applying one or more rules or policies to the information indicative of the event; and
wherein the one or more rules or policies are workload-dependent, node-dependent, dependent on a previous state, or dependent on an attack domain.

8. The method of claim 1, wherein said initiating a response comprises one or more of: constructing an attack tree model for the distributed computing system, constructing an overlay network for the distributed computing system over which event detection messages or attack response messages are to be sent, sending an attack notification message to one or more of the plurality of nodes, modifying a resource allocation associated with one or more of the plurality of nodes, or removing a resource associated with one or more of the plurality of nodes from a resource pool in the distributed computing system.

9. The method of claim 1, wherein in response to classifying the event as being representative of an unknown attack pattern, said initiating a response comprises one or more of: performing a clustering analysis to identify a known attack pattern sharing at least some characteristics with the unknown attack pattern, randomly selecting a response action, or simulating the unknown attack pattern.

10. The method of claim 1, wherein the observed behavior comprises one or more of: a resource-related, performance-related, or workload-related parameter value crossing a threshold value; a parameter value change rate for a resource-related, performance-related, or workload-related parameter exceeding a change rate threshold; a resource-related, performance-related, or workload-related parameter value becoming out of range; a resource-related, performance-related, or workload-related parameter value becoming in range; or a change in a parameter value trend for a resource-related, performance-related, or workload-related parameter.

11. The method of claim 1, wherein the event is representative of a distributed denial of service attack on the distributed computing system.

12. A non-transitory, computer-readable storage medium storing program instructions computer-executable to implement:
receiving a message comprising information indicative of an event detected on one of a plurality of nodes in a distributed computing system, wherein the information comprises an indication of a resource-related, performance-related, or workload-related run-time behavior of the one of the plurality of nodes;
accessing a knowledge base comprising information about run-time behaviors associated with known computing system attack patterns, wherein said run-time behaviors are indicative of known attack patterns that lead to removal or degradation of one or more nodes of a computing system by external requests to said one or more nodes;
classifying the event detected on the one node as being representative of one of the known computing system attack patterns or as being representative of an unknown attack pattern, dependent, at least in part, on the knowledge base and on the information in the received message, wherein said classifying indicates a current or near-term attack on the one node by external requests to the one node; and
initiating a response to the event, dependent on said classifying.

13. The storage medium of claim 12, wherein the program instructions are further executable to implement:
updating the knowledge base using reinforcement learning, dependent on said response;
wherein said classifying comprises applying an attack detection and classification technique; and
wherein said updating comprises tuning the attack detection and classification technique using reinforcement learning.

14. The storage medium of claim 12, wherein the program instructions are further executable to implement:
determining a probability that the event signifies an attack on the distributed computing system;
wherein said determining comprises applying one or more rules or policies to the information indicative of the event; and
wherein the one or more rules or policies are workload-dependent, node-dependent, dependent on a previous state, or dependent on an attack domain.

15. The storage medium of claim 12, wherein said initiating a response comprises one or more of: constructing an attack tree model for the distributed computing system, constructing an overlay network for the distributed computing system over which event detection messages or attack response messages are to be sent, sending an attack notification message to one or more of the plurality of nodes, modifying a resource allocation associated with one or more of the plurality of nodes, removing a resource associated with one or more of the plurality of nodes from a resource pool in the distributed computing system, dynamically modifying an attack tree model of the distributed computing system, dynamically modifying an overlay network of the distributed computing system over which event detection messages or attack response messages are sent, performing a clustering analysis to identify a known attack pattern sharing at least some characteristics with an unknown attack pattern, randomly selecting a response action for an unknown attack pattern, or simulating an unknown attack pattern.

16. The storage medium of claim 12,
wherein the observed behavior comprises one or more of:
a resource-related, performance-related, or workload-related parameter value crossing a threshold value; a parameter value change rate for a resource-related, performance-related, or workload-related parameter exceeding a change rate threshold; a resource-related, performance-related, or workload-related parameter value becoming out of range; a resource-related, performance-related, or workload-related parameter value becoming in range; or a change in a parameter value trend for a resource-related, performance-related, or workload-related parameter; and
wherein the event is representative of a distributed denial of service attack on the distributed computing system.

17. A distributed computing system comprising plurality of nodes, wherein one of the plurality of nodes comprises:
one or more processors; and
a memory coupled to the one or more processors and storing program instructions executable by the one or more processors to implement:
receiving a message comprising information indicative of an event detected on one of a plurality of nodes in a distributed computing system, wherein the information comprises an indication of a resource-related, performance-related, or workload-related run-time behavior of the one of the plurality of nodes;
accessing a knowledge base comprising information about run-time behaviors associated with known computing system attack patterns, wherein said run-time behaviors are indicative of known attack patterns that lead to removal or degradation of one or more nodes of a computing system by external requests to said one or more nodes;
classifying the event detected on the one node as being representative of one of the known computing system attack patterns or as being representative of an unknown attack pattern, dependent, at least in part, on the knowledge base and on the information in the received message, wherein said classifying indicates a current or near-term attack on the one node by external requests to the one node; and
initiating a response to the event, dependent on said classifying.

18. The system of claim 17, wherein the program instructions are further executable to implement:
updating the knowledge base using reinforcement learning, dependent on said response;
wherein said classifying comprises applying an attack detection and classification technique; and
wherein said updating comprises tuning the attack detection and classification technique using reinforcement learning.

19. The system of claim 17, wherein the program instructions are further executable to implement:
determining a probability that the event signifies an attack on the distributed computing system;
wherein said determining comprises applying one or more rules or policies to the information indicative of the event; and
wherein the one or more rules or policies are workload-dependent, node-dependent, dependent on a previous state, or dependent on an attack domain.

20. The system of claim 17, wherein said initiating a response comprises one or more of: constructing an attack tree model for the distributed computing system, constructing an overlay network for the distributed computing system over which event detection messages or attack response messages are to be sent, sending an attack notification message to one or more of the plurality of nodes, modifying a resource allocation associated with one or more of the plurality of nodes, removing a resource associated with one or more of the plurality of nodes from a resource pool in the distributed computing system, dynamically modifying an attack tree model of the distributed computing system, dynamically modifying an overlay network of the distributed computing system over which event detection messages or attack response messages are sent, performing a clustering analysis to identify a known attack pattern sharing at least some characteristics with an unknown attack pattern, randomly selecting a response action for an unknown attack pattern, or simulating an unknown attack pattern.

* * * * *